United States Patent
Shigitani et al.

(10) Patent No.: US 11,892,665 B2
(45) Date of Patent: Feb. 6, 2024

(54) COLLOIDAL CRYSTAL STRUCTURE, AND LIGHT-EMITTING DEVICE AND LIGHTING SYSTEM USING SAME

(71) Applicant: Panasonic Intellectual Property Management Co., Ltd., Osaka (JP)

(72) Inventors: Ryosuke Shigitani, Osaka (JP); Shumpei Fujii, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 267 days.

(21) Appl. No.: 17/423,877

(22) PCT Filed: Jan. 15, 2020

(86) PCT No.: PCT/JP2020/001082
§ 371 (c)(1),
(2) Date: Jul. 18, 2021

(87) PCT Pub. No.: WO2020/153197
PCT Pub. Date: Jul. 30, 2020

(65) Prior Publication Data
US 2022/0120948 A1    Apr. 21, 2022

(30) Foreign Application Priority Data
Jan. 23, 2019 (JP) ................... 2019-009444

(51) Int. Cl.
*G02B 5/26* (2006.01)
*F21V 9/08* (2018.01)
(Continued)

(52) U.S. Cl.
CPC .................. *G02B 5/26* (2013.01); *F21V 9/08* (2013.01); *G02B 5/24* (2013.01); *B82Y 20/00* (2013.01)

(58) Field of Classification Search
CPC .. B82Y 20/00; F21V 9/08; G02B 5/24; G02B 5/26
See application file for complete search history.

(56) References Cited

U.S. PATENT DOCUMENTS 9,903,544 B2    2/2018  Kurita
10,158,054 B1 * 12/2018 Lin .................. H01L 33/56
(Continued)

FOREIGN PATENT DOCUMENTS

| CN | 101408628 | * | 4/2009 | ....... G02F 1/133606 |
| CN | 104728779 | * | 1/2018 | ........... G02F 1/1336 |

(Continued)

OTHER PUBLICATIONS

Partial Supplementary European Search Report for corresponding EP Application No. 20744231.0 dated Feb. 14, 2022.
(Continued)

*Primary Examiner* — Zheng Song
(74) *Attorney, Agent, or Firm* — Renner, Otto, Boisselle & Sklar, LLP

(57) ABSTRACT

A colloidal crystal structure includes a colloidal crystal layer including a plurality of colloidal particles and a binder disposed between the plurality of colloidal particles to fix the colloidal particles, and a refractive index control material that is provided on one surface of the colloidal structural layer, is transparent, and has a refractive index difference of less than 10% with respect to the binder. A light-emitting device includes an optical filter including the colloidal crystal structure, and a light source, and a part of primary light emitted by the light source passes through the optical filter. A lighting system includes the light-emitting device.

16 Claims, 11 Drawing Sheets

(51) Int. Cl.
 *G02B 5/24* (2006.01)
 *B82Y 20/00* (2011.01)

(56) References Cited

U.S. PATENT DOCUMENTS

| | | | | |
|---|---|---|---|---|
| 2007/0126074 | A1* | 6/2007 | Chuang | G02B 5/0247 257/432 |
| 2013/0075676 | A1* | 3/2013 | Purdy | B42D 25/29 252/586 |
| 2014/0017145 | A1* | 1/2014 | Aizenberg | C08G 59/502 422/425 |
| 2016/0025906 | A1* | 1/2016 | Liu | B32B 7/06 362/330 |
| 2016/0178493 | A1* | 6/2016 | Kawanaka | G02B 1/04 356/601 |
| 2017/0138548 | A1 | 5/2017 | Kurita | |
| 2017/0235175 | A1* | 8/2017 | Suzuka | G02F 1/134309 349/33 |
| 2019/0004237 | A1* | 1/2019 | Kitano | B32B 27/20 |
| 2019/0301709 | A1* | 10/2019 | Chen | C09K 11/02 |

FOREIGN PATENT DOCUMENTS

| | | |
|---|---|---|
| JP | 2007-29775 A | 2/2007 |
| JP | 2010-58091 A | 3/2010 |
| JP | 5541620 B | 7/2014 |
| JP | 2015-177781 A | 10/2015 |
| JP | 2017 003843 A | 1/2017 |
| JP | 2017-91866 A | 5/2017 |
| JP | 2018-203814 A | 12/2018 |
| WO | WO-2015156227 A1 * 10/2015 ........... G02B 6/0068 |
| WO | 2016/186158 A1 | 11/2016 |

OTHER PUBLICATIONS

Extended European Search Report for corresponding EP Application No. 20744231.0 dated May 16, 2022.
International Search Report for corresponding Application No. PCT/JP2020/001082, dated Mar. 17, 2020.
Written Opinion for corresponding Application No. PCT/JP2020/001082, dated Mar. 17, 2020.

* cited by examiner (a)

(b)

(c)

(a)

(b)

COLLOIDAL CRYSTAL STRUCTURE, AND LIGHT-EMITTING DEVICE AND LIGHTING SYSTEM USING SAME

TECHNICAL FIELD

The present invention relates to a colloidal crystal structure, and a light-emitting device and a lighting system using the same.

BACKGROUND ART

An assembly in which colloidal particles are arrayed three-dimensionally and periodically is called a colloidal crystal due to a similarity thereof to normal crystals. When light enters this colloidal crystal, diffraction interference of the light occurs inside the colloidal crystal, and accordingly, a phenomenon that the colloidal crystal reflects light with a specific wavelength occurs due to a periodic structure thereof. For example, a colloidal crystal made of sub-micron-sized colloidal particles can reflect light in a range from ultraviolet to visible, and further to infrared wavelengths according to a size of the particles. Due to such characteristics, it is considered to apply the colloidal crystal to a color material, an optical memory material, a display device, an optical filter, an optical switch, a sensor and the like.

Patent Literature 1 discloses a method for producing a colloidal crystalline film, the method including: a step of forming a coating film by coating a substrate with a colloidal dispersion liquid in which colloidal particles are dispersed in a three-dimensionally regular array state in a dispersion medium component; and a step of producing a colloidal crystal film by polymerizing the dispersion medium component in the coating film. Moreover, Patent Literature 1 discloses that a colloidal crystal film in which a predetermined reflection peak is generated in a reflection spectrum is obtained by the above-described production method, and further, that a colloidal crystal pigment is obtained by pulverizing the colloidal crystal film.

CITATION LIST

Patent Literature

Patent Literature 1: Japanese Patent No. 5541620

SUMMARY OF INVENTION

An example in Patent Literature 1 describes that a reflection peak having a peak wavelength of 596 nm, a reflectance of 47% and a full width at half maximum of 25 nm is obtained in the reflection spectrum of the colloidal crystal film. However, in the reflection spectrum of Patent Literature 1, in addition to the reflection peak having the peak wavelength of 596 nm, a reflection peak can also be confirmed at around 670 nm. Thus, when the colloidal crystal film of Patent Literature 1 is used as an optical filter, color rendering properties and reflection efficiency may be lowered.

The present invention has been made in consideration of such a problem as described above, which is inherent in the prior art. Then, it is an object of the present invention to provide a colloidal crystal structure capable of preventing deterioration in color rendering properties and reflection efficiency when used as an optical filter, and a light-emitting device and a lighting system using the colloidal crystal structure.

A colloidal crystal structure according to a first aspect of the present invention includes: a colloidal crystal layer including a plurality of colloidal particles, and a binder disposed between the plurality of colloidal particles to fix the colloidal particles; and a refractive index control material that is provided on one surface of the colloidal crystal layer, is transparent, and has a refractive index difference of less than 10% with respect to the binder.

A colloidal crystal structure according to a second aspect of the present invention includes: a colloidal structural layer including a plurality of types of colloidal particles, and a binder disposed between the plurality of types of colloidal particles to fix the colloidal particles; and a refractive index control material that is provided on one surface of the colloidal structural layer, is transparent, and has a refractive index difference of less than 10% with respect to the binder. The plurality of types of colloidal particles includes at least first colloidal particles and second colloidal particles that are different in average particle size from each other. The first colloidal particles and the second colloidal particles have coefficients of variation of particle size, each being less than 20%. The plurality of types of colloidal particles forms a regular array in the binder.

A light-emitting device according to a third aspect of the present invention includes an optical filter comprising the colloidal crystal structure, and a light source, wherein a part of primary light emitted by the light source passes through the optical filter.

A lighting system according to a fourth aspect of the present invention includes the light-emitting device.

DESCRIPTION OF EMBODIMENTS

Figure 1:
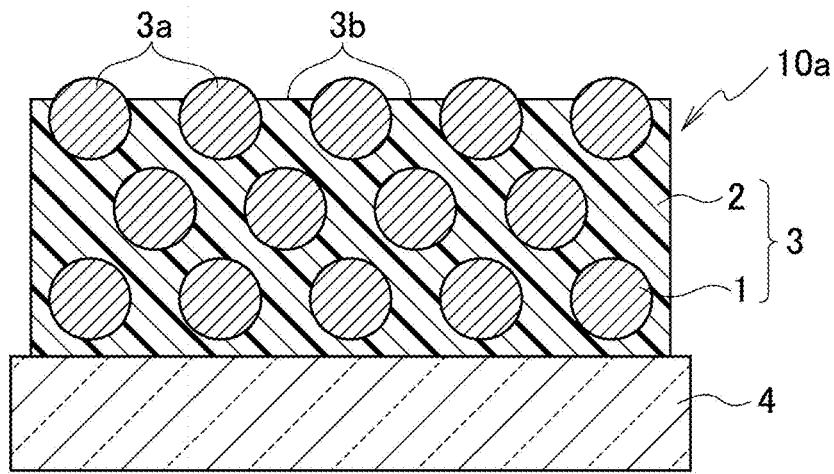
FIG. 1 is a cross-sectional view schematically illustrating an example of a structure with a colloidal crystal layer.
Figure 1:
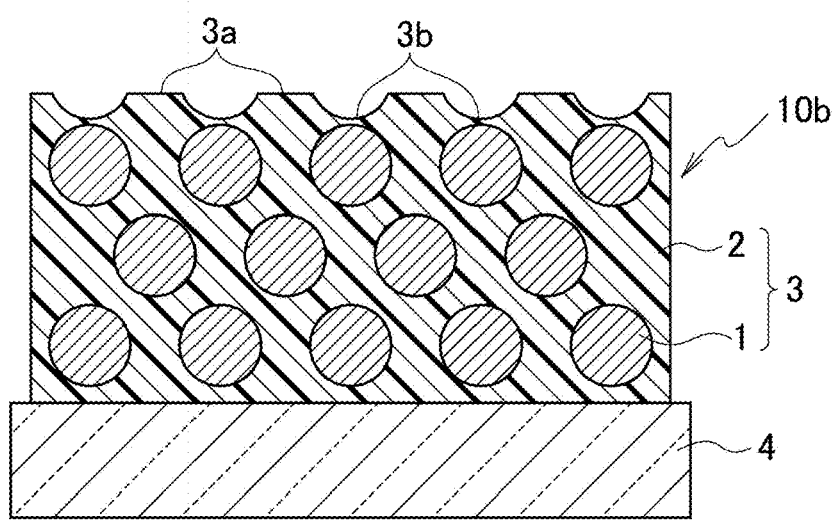
Figure 1:
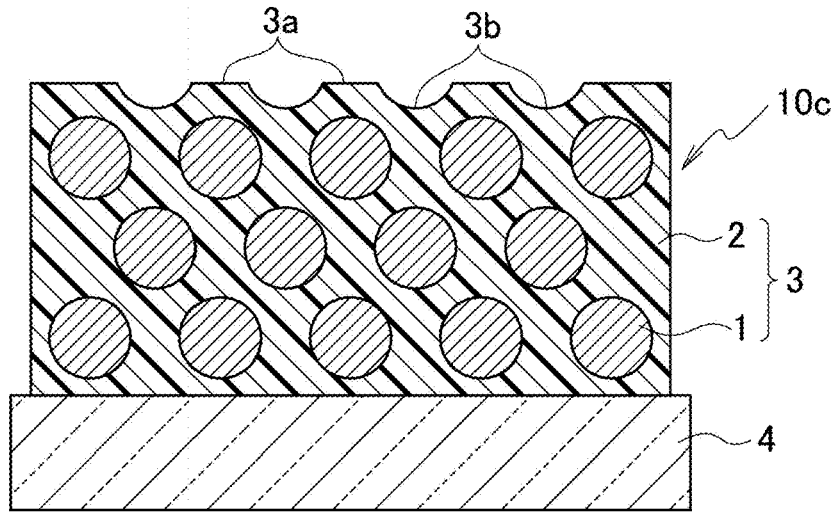

A detailed description will be given below of a colloidal crystal structure according to present embodiments, and a light-emitting device and a lighting system using the colloidal crystal structure. Note that dimensional ratios in the drawings are exaggerated for convenience of explanation, and are sometimes different from actual ratios.

[Colloidal Crystal Structure]

First Embodiment

FIG. 1 illustrates a structure with a colloidal crystal layer. A structure 10a illustrated in FIG. 1(a) includes a colloidal crystal layer 3 including a plurality of colloidal particles 1 and a binder 2 arranged between the colloidal particles 1 to fix the colloidal particles 1. Further, in the structure 10a, the colloidal crystal layer 3 is held by a substrate 4. As illustrated in FIG. 1(a), the colloidal particles 1 are three-dimensionally and periodically arranged to form a colloidal crystal, and further the binder 2 is interposed between the adjacent colloidal particles 1. That is, the structure 10a does not have a closely packed colloidal crystal formed in such a manner that colloidal particles contact one another, but has a loosely packed colloidal crystal in which colloidal particles are spaced apart from one another.

Here, when a colloidal crystal having the binder 2 provided between the plurality of colloidal particles 1 is made, a fine uneven structure due to a periodic structure of the colloidal crystal may be formed on a surface of the colloidal crystal layer 3, although the degree varies depending on the material. Specifically, as illustrated in FIG. 1(a), the colloidal crystal layer 3 may have concave parts and convex parts formed on the surface opposite to a surface facing the substrate 4. A convex part 3a is formed by the colloidal particle 1 exposed from the surface of the colloidal crystal layer 3. A concave part 3b is formed by exposed colloidal particles 1 and the binder 2 positioned between adjacent colloidal particles 1. The fine uneven structure on the surface of the colloidal crystal layer 3 is formed due to a regular array of the colloidal particles 1.

The uneven structure formed on the surface of the colloidal crystal layer 3 may be, for example, structures illustrated in FIG. 1(b) and FIG. 1(c) in addition to the structure illustrated in FIG. 1(a). Similar to the structure 10a, a structure 10b illustrated in FIG. 1(b) also includes the colloidal crystal layer 3 including the plurality of colloidal particles 1 and the binder 2 arranged between the colloidal particles 1, and the substrate 4 holding the colloidal crystal layer 3. As illustrated in FIG. 1(b), the concave part 3b is formed by the binder 2 along the vertical direction of the colloidal particles 1 positioned at the uppermost, and the convex part 3a is formed by the binder 2 positioned between the adjacent concave parts 3b. Similar to the structures 10a and 10b, a structure 10c illustrated in FIG. 1(c) also includes the colloidal crystal layer 3 including the plurality of colloidal particles 1 and the binder 2 arranged between the colloidal particles 1, and the substrate 4 holding the colloidal crystal layer 3. As illustrated in FIG. 1(c), the convex part 3a is formed by the binder 2 along the vertical direction of the colloidal particles 1 positioned at the uppermost, and the concave part 3b is formed by the binder 2 positioned between the adjacent convex parts 3a.

The mechanism for the formation of such convex parts 3a and concave parts 3b is not necessarily clear, but the following may be considered. In the method for producing the colloidal crystal layer 3, first, the colloidal particles 1 are dispersed in a monomer that is a precursor of the binder 2 to prepare a colloidal dispersion liquid. Next, the obtained colloidal dispersion liquid is applied onto the substrate 4 to make a coating film. The monomer in the coating film is polymerized by an active energy ray, and the colloidal particles 1 are immobilized with a polymer. By such a process, the colloidal crystal layer 3 is formed on the substrate 4. Here, when the monomer that is the precursor of the binder 2 is polymerized to form the polymer, the monomer shrinks and the volume decreases, but the colloidal particles 1 do not shrink. Therefore, it is assumed that the regular convex parts 3a and concave parts 3b are formed on the surface of the colloidal crystal layer 3 due to the shrinkage of the monomer by polymerization and the three-dimensional periodic structure of the colloidal particles 1.

Figure 2:
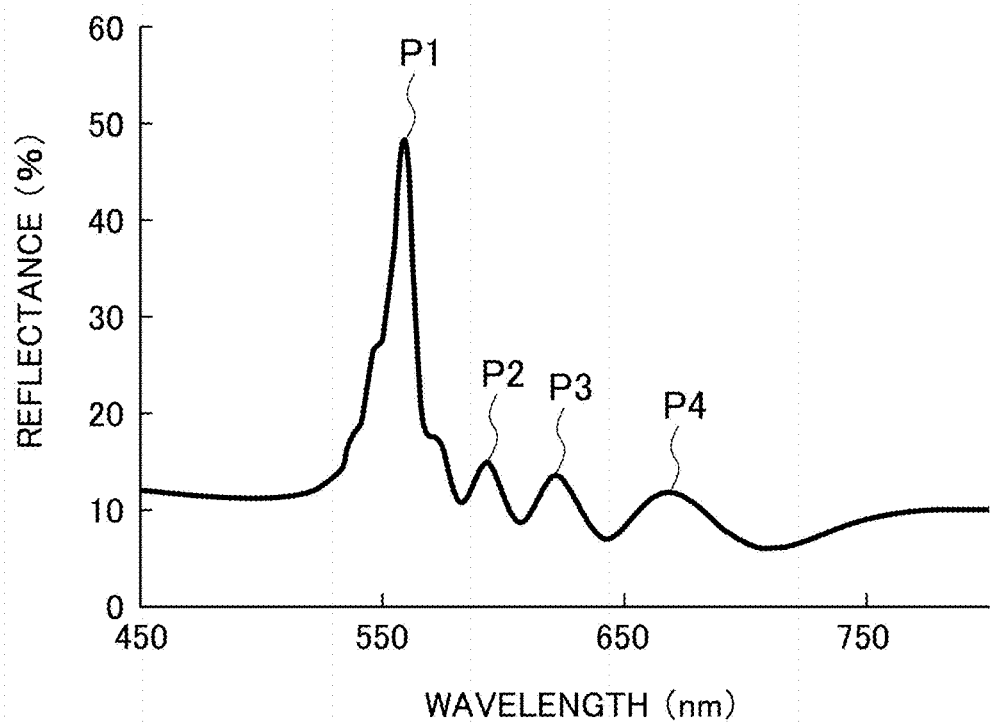
FIG. 2 is a diagram illustrating an example of a reflection spectrum of the colloidal crystal layer in FIG. 1.

FIG. 2 illustrates an example of a reflection spectrum of the colloidal crystal layer 3 illustrated in FIG. 1. As illustrated in FIG. 2, it is seen that the colloidal crystal layer 3 has a reflection peak P1 having a reflectance of about 50% at around 560 nm. The colloidal crystal layer 3 also has reflection peaks P2, P3, and P4, each having a reflectance of less than 20%, at around 590 nm, 620 nm, and 670 nm, respectively. Thus, when the colloidal crystal layer 3 is used for an optical filter, for example, light at around 590 nm, 620 nm, and 670 nm is also reflected in addition to at around 560 nm, so that color rendering properties and reflection efficiency may be lowered.

As a result of examining the cause of the multiple sub-peaks in addition to the main peak at around 560 nm, the present inventor speculated that they were caused by the regular convex parts 3a and concave parts 3b formed on the surface of the colloidal crystal layer 3. The present inventor further speculated that the multiple sub-peaks were caused by diffraction or interference of reflected light due to the fine uneven structure formed by the convex parts 3a and the concave parts 3b.

Figure 3:
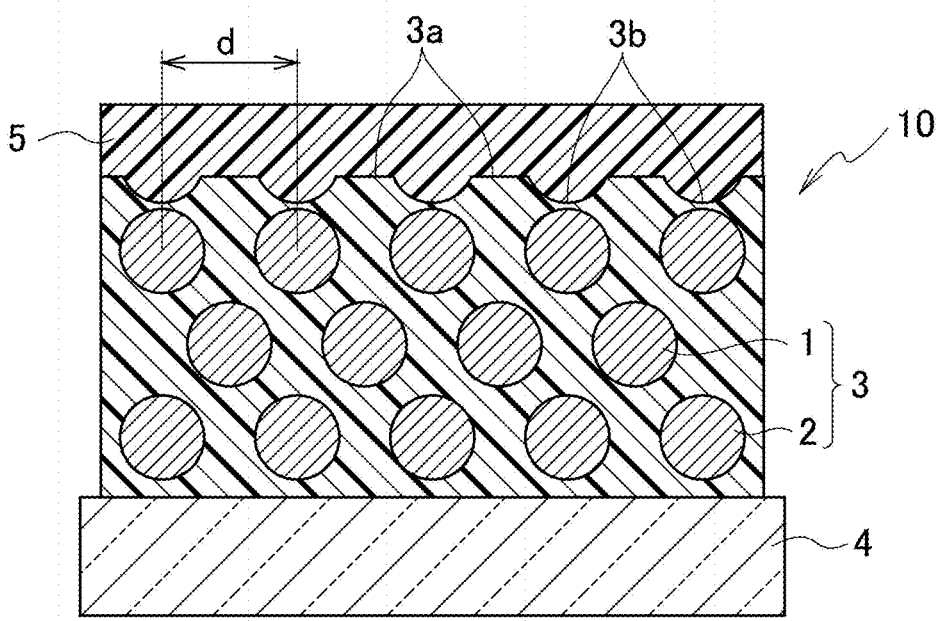
FIG. 3 is a cross-sectional view schematically illustrating an example of a colloidal crystal structure according to the present embodiment.

As a result of diligent study to solve the issue due to the sub-peaks described above, the present inventor found that the issue could be solved by filling the fine uneven structure formed on the surface of the colloidal crystal layer 3 with another substance, which led to the completion of the present embodiment. As illustrated in FIG. 3, the colloidal crystal structure 10 according to the present embodiment includes the colloidal crystal layer 3 including the plurality of colloidal particles 1 and the binder 2 arranged between the plurality of colloidal particles 1, and the substrate 4 holding the colloidal crystal layer 3. The colloidal crystal structure 10 further includes a refractive index control material 5 provided on the surface of the colloidal crystal layer 3.

In the colloidal crystal layer 3 of the colloidal crystal structure 10, the plurality of colloidal particles is arranged three-dimensionally and regularly, and further the binder 2 is interposed between the colloidal particles 1 adjacent. That is, the colloidal crystal layer 3 does not have a closely packed colloidal crystal formed in such a manner that the colloidal particles 1 contact one another, but has a loosely packed colloidal crystal in which the colloidal particles are spaced apart from one another. Such a loosely packed colloidal crystal as described above is provided, whereby a part of light applied to the colloidal crystal layer 3 can cause Bragg reflection, and a part of light that is not reflected can pass through the colloidal crystal layer 3.

In the colloidal crystal layer 3, preferably, the colloidal particles 1 contain at least one of an inorganic material or a resin material. The colloidal particles 1 contain an inorganic material, whereby durability of the obtained colloidal crystal can be enhanced. The colloidal particles 1 contain an organic material, whereby it becomes easy to form the shape of the colloidal particles into a spherical shape, and accordingly, it becomes easy for the colloidal particles 1 to form a regular array. Note that the colloidal particles 1 may be formed of only an inorganic material, or may be formed of only a resin material. Further, the colloidal particles 1 may be formed of both of an inorganic material and a resin material. Note that, preferably, the regular array adopted by the plurality of colloidal particles 1 is, for example, a close-packed structure, a face-centered cubic structure or a body-centered cubic structure.

As such an inorganic material, for example, metal, such as gold and silver, and a metal oxide, such as silica, alumina and titania, can be used. As such a resin material, styrenic resin, acrylic resin and the like can be used. These materials may be used singly or in combination of two or more types thereof.

The styrene resin is formed by polymerizing a styrenic monomer as a main component. As the styrenic monomer, there are mentioned styrene, o-methylstyrene, m-methylstyrene, p-methylstyrene, α-methylstyrene, and p-methoxystyrene. Moreover, p-tert-butylstyrene, p-phenylstyrene, o-chlorostyrene, m-chlorostyrene, and p-chlorostyrene are also mentioned. These styrenic monomers may be used singly or in combination of two or more types thereof. Note that, in this description, a main component means 50% by mass or more.

The acrylic resin is formed by polymerizing a (meth) acrylic monomer as a main component, and may contain other monomers co-polymerizable with the (meth) acrylic monomer. As such a (meth) acrylic monomer, methyl (meth) acrylate, ethyl (meth) acrylate, 2-hydroxyethyl (meth) acrylate, 2-hydroxypropyl (meth) acrylate, and cyclohexyl (meth) acrylate are mentioned. β-carboxyethyl (meth) acrylate, diethyleneglycol di(meth) acrylate, 1,6-hexanediol di(meth) acrylate, triethyleneglycol di(meth) acrylate, and tripropyleneglycol di(meth) acrylate are also mentioned. Moreover, trimethylolpropane tri(meth) acrylate, pentaerythritol tri(meth) acrylate, 1,6-hexanediol diglycidylether di(meth) acrylate are also mentioned. Bisphenol A diglycidylether di(meth) acrylate, neopentylglycol diglycidylether di(meth) acrylate, dipentaerythritol hexa(meth) acrylate, and tricyclodecanyl(meth) acrylate are mentioned. The (meth) acrylic monomers may be used singly or in combination of two or more types thereof. Note that, in this description, the (meth) acrylic monomer includes a methacrylic monomer and an acrylic monomer.

Note that, preferably, the colloidal particles 1 are made of inorganic particles, particularly preferably, are made of silica. Since it is easy to purchase the colloidal particles 1 made of silica, it becomes possible to enhance industrial productivity of the colloidal crystal layer 3. Also preferably, the colloidal particles 1 are made of polymer particles, particularly preferably, made of at least one of acrylic resin or polystyrene. As for the colloidal particles 1 made of a polymer, spherical ones are easily available, and further, the colloidal particles 1 made of acrylic resin and/or polystyrene are widely used and easy to purchase, and therefore, it becomes possible to enhance the industrial productivity of the colloidal crystal layer 3.

In the colloidal crystal layer 3, preferably, the binder 2 that fixes the colloidal particles 1 contains resin for example. The binder 2 contains resin, whereby the resin that is a solid immobilizes the regular array of the colloidal particles 1, and accordingly, mechanical strength of the colloidal crystal layer 3 can be enhanced. Moreover, as will be described later, the resin can be cured by active energy rays, and accordingly, it becomes possible to enhance handleability of the colloidal crystal layer 3, and to improve productivity thereof. Note that, as the binder 2, it is preferable to use resin that has high light transmittance in a wavelength range of 300 nm or more and less than 800 nm.

Preferably, the resin for use in the binder 2 contains at least one selected from the group consisting of acrylic resin, polycarbonate resin, cycloolefin resin, epoxy resin, silicone resin, an acrylic-styrene copolymer and styrenic resin.

Those mentioned above can be used as the acrylic resin and the styrenic resin. As the polycarbonate resin, for example, there are mentioned: an aromatic polycarbonate polymer obtained by reacting divalent phenol with phosgene or a carbonic acid diester compound; and aromatic polycarbonate resin that is a copolymer of these. Moreover, as the polycarbonate resin, aliphatic polycarbonate resin obtained by a copolymer of carbon dioxide and epoxide is also mentioned. Further, as the polycarbonate resin, aromatic-aliphatic polycarbonate obtained by copolymerizing these is also mentioned. Moreover, straight-chain aliphatic divalent carbonic acids such as adipic acid, pimelic acid, suberic acid, azelaic acid, sebacic acid and decanedicarboxylic acid are also mentioned as such copolymerizable monomers of the polycarbonate resin.

The cycloolefin resin is resin in which principal chains are made of carbon-carbon bonds and a cyclic hydrocarbon structure is provided in at least a part of the principal chains. As the cycloolefin resin, an addition copolymer of ethylene and norbornene, an addition copolymer of ethylene and tetracyclododecene, and the like are mentioned.

The epoxy resin is resin obtained by curing, by a curing agent, a prepolymer that contains two or more epoxy groups in one molecule. As the epoxy resin, for example, there can be used bisphenol A-type epoxy resin, bisphenol F-type epoxy resin, bisphenol S-type epoxy resin, biphenyl-type epoxy resin, naphthalene diol-type epoxy resin, and phenol novolac-type epoxy resin. Moreover, cresol novolac-type epoxy resin, bisphenol A novolac-type epoxy resin, cyclic aliphatic epoxy resin, and heterocyclic epoxy resin (triglycidyl isocyanurate, diglycidyl hydantoin and the like) can be used. Further, modified epoxy resins obtained by modifying these epoxy resins by various materials can also be used. Moreover, halides such as bromides and chlorides of these epoxy resins can also be used.

The silicone resin is resin in which straight-chain polymers made of siloxane bonds cross-link with one another to form a three-dimensional net structure. The silicone resin includes, for example, dimethyl silicone in which side chains are composed of a methyl group, and aromatic silicone in which aromatic molecules are substituted for a part. In the present embodiment, it is the aromatic silicone that is particularly preferable as the silicone resin.

The acrylic-styrene copolymer is one obtained by polymerizing the (meth) acrylic monomer and the styrenic monomer as main components. Moreover, the acrylic-styrene copolymer may contain other monomers polymerizable with the (meth) acrylic monomer and the styrenic monomer. As the acrylic-styrene copolymer, a styrene-(meth) acrylic acid ester copolymer, a styrene-diethylaminoethylmethacrylate copolymer, and a styrene-butadiene-acrylic acid ester copolymer are mentioned.

An average particle size of the colloidal particles 1 in the colloidal crystal layer 3 is preferably 10 nm to 10 μm, more preferably 10 nm to 1000 nm, still more preferably 50 nm to 300 nm, particularly preferably 70 nm to 280 nm. The average particle size of the colloidal particles 1 is 10 nm or more, whereby cohesive force between the surfaces of the adjacent colloidal particles 1 decreases, resulting in a tendency to facilitate even dispersion of the colloidal particles 1 in a dispersion liquid to be described later. The average particle size of the colloidal particles 1 is 10 μm or less, whereby sedimentation of the colloidal particles 1 is suppressed, resulting in a tendency to facilitate the even dispersion of the colloidal particles 1 in the dispersion liquid. Note that, in this description, the average particle size of the colloidal particles 1 can be obtained by observing the surfaces of the colloidal crystal layer 3 by a scanning electron microscope and measuring particle sizes of the plurality of colloidal particles 1.

As mentioned above, the colloidal crystal layer 3 includes the plurality of colloidal particles 1. Then, preferably, a coefficient of variation of the particle size of the colloidal particles 1 is less than 20%. The coefficient of variation of the particle size is a value obtained by Equation 1, and a smaller value thereof means a smaller variation of the particle size.

$$[\text{coefficient of variation}(\%)] = [\text{standard devation of particle size}]/[\text{average particle size}] \times 100 \quad [\text{Equation 1}]$$

The coefficient of variation of the particle size of the colloidal particles 1 is less than 20%, whereby it becomes easy for the colloidal particles 1 to form the regular array in the binder 2. Therefore, the obtained colloidal crystal layer 3 becomes capable of reflecting the applied light highly efficiently. Note that the coefficient of variation of the particle size of the colloidal particles 1 is more preferably less than 15%, still more preferably less than 12%, particularly preferably less than 10%, most preferably less than 8%.

In the colloidal crystal layer 3, a center-to-center distance d between the adjacent colloidal particles 1 is preferably 100 nm or more and 300 nm or less, more preferably 140 nm or more and 300 nm or less. In the case of using the colloidal crystal layer 3 for an optical filter and a color material, a desired wavelength can be reflected by adjusting the center-to-center distance d of the colloidal particles. Note that the center-to-center distance d between the adjacent colloidal particles 1 can be obtained by observing the surface of the colloidal crystal layer 3 by a scanning electron microscope.

In the colloidal crystal layer 3, preferably, a ratio of a volume of the colloidal particles 1 with respect to a volume of the binder 2 is 20% by volume or more and 50% by volume or less. Such a volume ratio is 20% by volume or more, whereby the plurality of the colloidal particles 1 is arrayed three-dimensionally in a regular manner in the binder 2, and it becomes possible to further enhance the light reflectivity of the colloidal crystal layer 3. Moreover, this volume ratio is 50% by volume or less, thus making it possible to easily control the three-dimensional regular array to be formed in the binder 2. Moreover, the volume ratio is 20% by volume or more and 50% by volume or less, whereby a loosely packed colloidal crystal in which the colloidal particles 1 are spaced apart from one another is formed, and the binder 2 can be interposed between the colloidal particles 1. Therefore, it becomes possible to further enhance shape stability of the colloidal crystal layer 3.

The colloidal crystal layer 3 can reflect an arbitrary light component by adjusting the content ratio and/or particle sizes of the colloidal particles 1. Therefore, in the colloidal crystal layer 3, preferably, the reflection peak wavelength λ of the reflection spectrum stays within a wavelength range of 300 nm or more and less than 800 nm. In this case, since the colloidal crystal layer 3 exhibits reflection characteristics in the visible light range, the colloidal crystal layer 3 becomes an industrially usable structure, for example, for an optical filter, a color material and the like. Note that, in the colloidal crystal layer 3, more preferably, the reflection peak wavelength λ of the reflection spectrum stays within a wavelength range of 450 nm or more and less than 650 nm.

In the colloidal crystal layer 3, preferably, a maximum value of a reflectance in the wavelength range of 300 nm or more and less than 800 nm is 20% or more and less than 100%. In this case, the colloidal crystal layer 3 can selectively reduce light intensity at the reflection peak wavelength λ of the reflection spectrum, and therefore, becomes an industrially usable structure, for example, for an optical filter and the like.

More specifically, as mentioned above, the colloidal crystal layer 3 can control a wavelength and intensity of the reflected light by adjusting the content ratio and/or particle sizes of the colloidal particles 1. Then, not all of light within a specific wavelength range is reflected like a conventional light interference filter, but a part of the light within the specific wavelength range is reflected, whereby desired light can be taken out of the colloidal crystal layer 3. For example, when all of the light within the specific wavelength range is reflected, light that has passed through the colloidal crystal layer 3 goes away from natural white light, but a part of the light within the specific wavelength range is reflected while the remaining light has passed, whereby color rendering properties can be enhanced while maintaining natural white light. Note that, in the colloidal crystal layer 3, the maximum value of the reflectance in the wavelength range of 300 nm or more and less than 800 nm is preferably 20% to 95%, more preferably 20% to 80%.

In the colloidal crystal layer 3, preferably, a full width at half maximum (FWHM) of a peak of a reflection spectrum having the maximum reflectance in the wavelength range of 300 nm or more and less than 800 nm is 5 nm or more and 100 nm or less. The full width at half maximum tends to become smaller as a variation of a layer thickness of the colloidal crystal layer 3, the array of the colloidal particles, and the like are controlled more and more precisely. Therefore, preferably, the full width at half maximum is set to 5 nm or more from a viewpoint of productivity. Moreover, the full width at half maximum is set to 100 nm or less, whereby, for example, a concern can be reduced that light with a wavelength, which is required to enhance the color rendering properties, may be reflected by the colloidal crystal layer 3. Moreover, the full width at half maximum is set to 100 nm or less, whereby light emission efficiency can be suppressed from being reduced in a light-emitting device including the colloidal crystal layer 3. Note that, more preferably, the full width at half maximum is 10 nm to 60 nm.

As described above, in the colloidal crystal layer 3, preferably, the reflection peak wavelength λ of the reflection spectrum stays within a wavelength range of 300 nm or more and less than 800 nm. Here, preferably, the reflection peak wavelength λ of the reflection spectrum does not shift as much as possible when the colloidal crystal structure 10 is used. When the reflection peak wavelength λ shifts, the color tone of the reflected light or the transmitted light emitted from the colloidal crystal structure 10 may change, which makes it difficult to obtain desired output light.

Preferably, the three-dimensional regular array of the colloidal particles 1 in the colloidal crystal layer 3 does not change so that the reflection peak wavelength λ does not shift when the colloidal crystal structure 10 is used. Further, preferably, the center-to-center distance d between the adjacent colloidal particles 1 is constant. Thus, preferably, the volume of the binder 2 does not change when the colloidal crystal structure 10 is used. If the volume of the binder 2 changes, preferably, it changes within a range where the reflection peak wavelength λ of the reflection spectrum does not shift. In other words, preferably, the resin used for the binder 2 is a resin whose volume hardly changes when the colloidal crystal structure 10 is used, more preferably, a resin whose volume does not change when the colloidal crystal structure 10 is used. Specifically, preferably, the resin used for the binder 2 is not a resin whose volume changes by absorbing or releasing water.

Preferably, the colloidal crystal structure 10 includes the substrate 4 supporting the colloidal crystal layer 3. In the colloidal crystal structure 10, the substrate 4 is not an essential component. However, the colloidal crystal layer 3 is supported by the substrate 4, thus making it possible to enhance handleability and mechanical strength of the colloidal crystal layer 3. Note that, though the colloidal crystal layer 3 may be in contact with the surface of the substrate 4 as illustrated in FIG. 3, an interposing layer (not shown) may be disposed between the colloidal crystal layer 3 and the substrate 4.

Preferably, the substrate 4 has high translucency. For example, a total light transmittance of the substrate 4 is preferably 80% to 100%, more preferably 85% to 100%. The total light transmittance can be measured by, for example, a method such as Japanese Industrial Standard JIS K 7361-1: 1997 (Plastics—Determination of the total luminous transmittance of transparent materials—Part 1: Single beam instrument).

As the substrate 4, for example, a plate of glass such as soda-lime glass, low-alkali borosilicate glass, and non-alkali-alumino borosilicate glass can be used. Moreover, as the substrate 4, a plate of resin such as polycarbonate, acrylic resin, and polyethylene terephthalate can be used.

In the colloidal crystal structure 10, the shape of the colloidal crystal layer 3 is not limited, and for example, can be formed into a film shape. The thickness of the colloidal crystal layer 3 is not limited, but for example, preferably 10 μm to 5000 μm, more preferably 1000 μm to 3000 μm. In the colloidal crystal structure 10, the area of the colloidal crystal layer 3 is not limited, but preferably, is set to 5 mm² or more and 100 cm² or less. In this case, it becomes possible to apply the colloidal crystal structure 10 to a wide range of uses from various sensors to a large lighting apparatus.

As described above, when a colloidal crystal having the binder 2 provided between the colloidal particles 1 is made, a fine uneven structure due to the periodic structure of the colloidal crystal may be formed on the surface of the colloidal crystal layer 3, although the degree varies depending on the material. Since optical phenomena, such as diffraction and interference of reflected light, occur due to that uneven structure, color rendering properties and reflection efficiency may be lowered when the colloidal crystal layer 3 itself is used for an optical filter, such as illumination. To suppress the diffraction and interference of reflected light, the colloidal crystal structure 10 includes the refractive index control material 5 provided on the surface with the convex parts 3a and the concave parts 3b of the colloidal crystal layer 3.

As illustrated in FIG. 3, the refractive index control material 5 is provided to be in contact with the surface with the plurality of convex parts 3a and concave parts 3b of the colloidal crystal layer 3. Preferably, the refractive index control material 5 is provided to fill the plurality of concave parts 3b. By filling the periodic structure of the plurality of convex parts 3a and concave parts 3b, diffraction and interference of reflected light can be prevented.

The thickness of the refractive index control material 5 is not limited as long as the plurality of concave parts 3b can be filled, but preferably, the thickness is, for example, 10 nm or more and 2 mm or less. When the thickness of the refractive index control material 5 is large, the oxygen permeability of the refractive index control material 5 decreases, which can suppress the oxidation of the binder 2 and improve the durability of the colloidal crystal layer 3. When the thickness of the refractive index control material 5 is small, the light transmittance of the refractive index control material 5 improves, which can enhance optical characteristics of the colloidal crystal structure 10.

The material making the refractive index control material 5 is not limited as long as the concave parts 3b can be filled. However, preferably, the refractive index control material 5 is made from a resin material. Preferably, the resin used for the refractive index control material 5 is at least one selected from the group consisting of acrylic resin, polycarbonate resin, cycloolefin resin, epoxy resin, silicone resin, an acrylic-styrene copolymer, and styrene resin. Preferably, the refractive index control material 5 is made of an inorganic material. Preferably, the inorganic material used for the refractive index control material 5 is, for example, silica.

Preferably, the refractive index control material 5 is provided to fill at least the plurality of concave parts 3b. Preferably, the refractive index control material 5 is provided to cover the entire of the plurality of convex parts 3a and concave parts 3b. Preferably, the refractive index control material 5 is provided to cover the entire surface with the plurality of convex parts 3a and concave parts 3b of the colloidal crystal layer 3, that is, the entire surface of the colloidal crystal layer 3 opposite to the surface facing the substrate 4. The refractive index control material 5 may be a thin film of a single layer or a thin film of a plurality of layers. Specifically, the refractive index control material 5 may be a multilayer film formed by stacking a plurality of layers along a direction of stacking the colloidal crystal layer 3 and the substrate 4.

Preferably, the refractive index control material 5 is transparent. For example, a total light transmittance of the refractive index control material 5 is preferably 80% to 100%, more preferably 85% to 100%. The total light transmittance can be measured by a method, such as JIS K 7361-1: 1997, described above.

Preferably, the refractive index control material 5 has a refractive index difference of less than 10% with respect to the binder 2 of the colloidal crystal layer 3. That is, when the refractive index of the refractive index control material 5 is X, preferably, the refractive index of the binder 2 is in the range of more than X×0.90 and less than X×1.10. When the refractive index difference between the refractive index control material 5 and the binder 2 is 10% or more, irradiation light is reflected at the interface between the refractive index control material 5 and the colloidal crystal layer 3. At this time, interference and diffraction of reflected light occur due to the convex parts 3a and concave parts 3b on the surface of the colloidal crystal layer 3, and color rendering properties and reflection efficiency may be lowered. However, when the refractive index difference between the refractive index control material 5 and the binder 2 is less than 10%, the refractive index difference at the interface between the refractive index control material 5 and the colloidal crystal layer 3 can be made substantially equal. Thus, the diffraction phenomenon of the reflected light can be suppressed, and the color rendering properties and the reflection efficiency can be prevented from being lowered when the light source is combined with the colloidal crystal structure 10. Note that, preferably, the refractive index control material 5 has a refractive index difference of less than 5% with respect to the binder 2 of the colloidal crystal layer 3. In this case, it is possible to further suppress the diffraction phenomenon of the reflected light and to further prevent the deterioration of color rendering properties and reflection efficiency.

In this description, the refractive indices of the refractive index control material 5 and the binder 2 can be measured by JIS K 7142: 2014 (Plastic-Determination of refractive index) or optical interferometry. The refractive indices of the refractive index control material 5 and the binder 2 can be measured by optical interferometry, using a reflective film thickness monitor at a measurement wavelength of 550 nm.

In the colloidal crystal structure 10, preferably, a surface of the refractive index control material 5 opposite to the surface facing the colloidal crystal layer 3 does not have regular unevenness due to the colloidal crystal formed by the plurality of colloidal particles 1. That is, as described above, the plurality of convex parts 3a and concave parts 3b of the colloidal crystal layer 3 is formed due to the colloidal crystal formed by the plurality of colloidal particles 1. Preferably, the outermost surface of the refractive index control material 5 formed to cover the convex part 3a and concave part 3b of the colloidal crystal layer 3 does not have a regular uneven structure due to the convex part 3a and concave part 3b. Thus, when irradiation light is reflected on the outermost surface of the refractive index control material 5, it is possible to suppress the interference and diffraction of the reflected light, and deterioration of color rendering properties and reflection efficiency. When the outermost surface of the refractive index control material 5 does not have regular unevenness, the area of the outermost surface becomes small, which enhances the antifouling property. If a functional layer is to be provided on the outermost surface of the refractive index control material 5, the outermost surface is flat, which makes it easy to form the functional layer.

Next, a method for producing the colloidal crystal structure 10 according to the present embodiment will be described. In the method for producing the colloidal crystal structure 10, first, the colloidal particles 1 are dispersed together with at least one type of a monomer, whereby a colloidal dispersion liquid is prepared. Specifically, the colloidal particles 1 are added to a monomer that forms the binder 2 by polymerization. At this time, a liquid matter can be used as the monomer, and a powdery matter can be used as the colloidal particles 1. A method for dispersing the colloidal particles 1 into the monomer is not limited, and for example, the colloidal particles 1 can be dispersed by stirring and ultrasonic irradiation. Note that, in the case of polymerizing the monomer by an active energy ray, a photopolymerization initiator may be added to the colloidal dispersion liquid. As the photopolymerization initiator, a well-known photopolymerization initiator such as a radical photopolymerization initiator, a cation photopolymerization initiator, and an anion photopolymerization initiator can be used.

Next, the obtained colloidal dispersion liquid is applied onto the substrate 4, and a coating film is formed. A method for applying the colloidal dispersion liquid is not particularly limited; however, for example, a spray coating method, a spin coating method, a slit coating method, a roll coating method and the like can be used. Note that the coating film is left standing after the coating film is formed, whereby the colloidal particles are arrayed three-dimensionally and regularly.

Then, the monomer in the coating film is polymerized, whereby the plurality of colloidal particles 1 is fixed by a polymer. A method for polymerizing the monomer is not limited, and the monomer may be polymerized by heating, or may be polymerized by an active energy ray (electromagnetic wave, ultraviolet ray, visible light, infrared ray, electron beam, y ray and the like). By such steps as described above, the colloidal crystal layer 3 in which the plurality of colloidal particles 1 is arrayed regularly in the binder 2 can be obtained.

Next, a monomer solution containing a monomer forming the refractive index control material 5 by polymerization is prepared. Here, in the case of polymerizing the monomer by an active energy ray, a photopolymerization initiator may be added to the monomer solution. The monomer solution is applied to the surface, on which the convex parts 3a and concave parts 3b are formed, of the colloidal crystal layer 3 to form a coating film. The method for applying the monomer solution is not limited, however, for example, a spray coating method, a spin coating method, a slit coating method, a roll coating method and the like can be used. Then, the refractive index control material 5 can be obtained by polymerizing the monomer in the coating film. The method for polymerizing the monomer is not limited, and the monomer may be polymerized by heating or by an active energy ray.

As described above, after the coating film containing the monomer is formed on the surface of the colloidal crystal layer 3, the monomer is polymerized to form the refractive index control material 5. However, the method for forming the refractive index control material 5 is not limited to such a method, and any method can be applied as long as the refractive index control material 5 that can obtain the effect of the present embodiment can be formed.

For example, the refractive index control material 5 can also be formed by the following method. First, a thin film making the refractive index control material 5 is prepared in advance. Next, the thin film making the refractive index control material 5 is directly stacked on the surface of the colloidal crystal layer 3, and then vacuum lamination treatment is applied to form the refractive index control material 5 on the surface of the colloidal crystal layer 3. Note that the vacuum lamination can be performed by using, for example, a vacuum laminator.

As described above, the colloidal crystal structure 10 according to the present embodiment includes the colloidal crystal layer 3 including the plurality of colloidal particles 1 and the binder 2 arranged between the plurality of colloidal particles 1 to fix the colloidal particles 1. The colloidal crystal structure 10 further includes the refractive index control material 5 that is provided on one surface of the colloidal crystal layer 3, is transparent, and further has a refractive index difference of less than 10% with respect to the binder 2. According to the present embodiment, when the colloidal crystal layer 3 has a fine uneven structure due to the periodic structure of the colloidal particles 1 formed on the surface thereof, the refractive index difference at the interface of the uneven structure can be made substantially equal by the refractive index control material 5. Therefore, the diffraction phenomenon of the reflected light can be suppressed, and the color rendering properties and the reflection efficiency can be prevented from being lowered when the light source is combined with the colloidal crystal structure 10. When the oxygen permeability of the refractive index control material 5 is low, the oxidation of the binder 2 is suppressed, which also enhances the durability of the colloidal crystal layer 3. Further, the colloidal crystal layer 3 is covered and protected by the refractive index control material 5, which maintains the three-dimensional regular array of the colloidal particles 1 for a long period of time and maintains a high reflectance.

Preferably, the colloidal crystal structure 10 further includes the substrate 4 that is provided on a surface opposite to one surface of the colloidal crystal layer 3 and has translucency. This enables the colloidal crystal layer 3 to be held by the substrate 4, which improves the handling of the colloidal crystal structure 10. Further, since the substrate 4 has translucency, the colloidal crystal structure 10 is usable for an application utilizing transmitted light, such as an optical filter.

Second Embodiment

Next, a colloidal crystal structure according to a second embodiment will be described in detail with reference to the drawings. The same components as those in the first embodiment are denoted by the same reference numerals, and redundant description is omitted.

Figure 4:
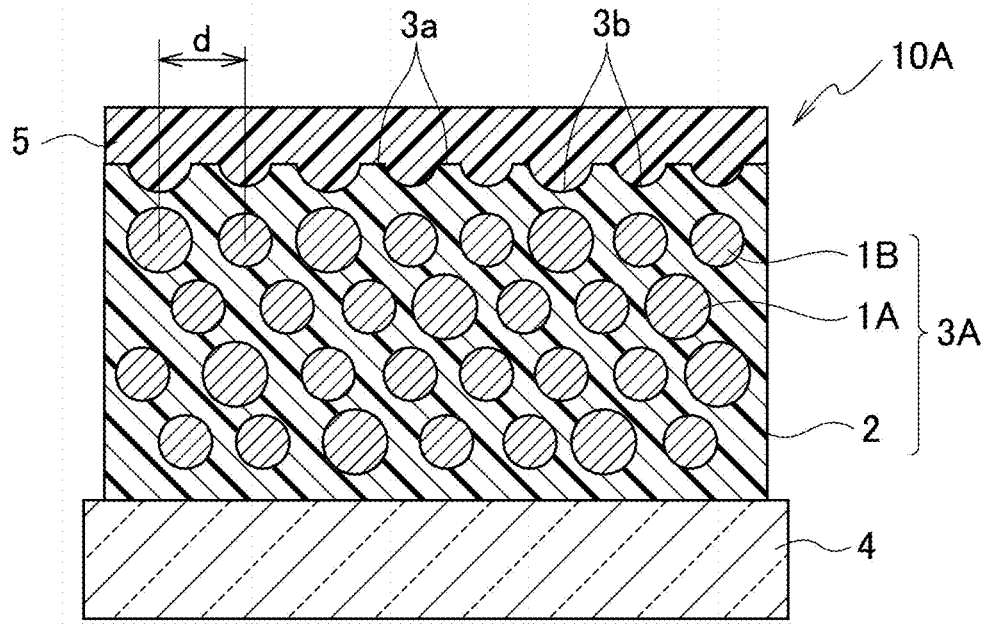
FIG. 4 is a cross-sectional view schematically illustrating another example of a colloidal crystal structure according to a present embodiment.

As illustrated in FIG. 4, a colloidal crystal structure 10A according to the present embodiment includes a colloidal structural layer 3A including a plurality of types of colloidal particles and the binder 2 arranged between the plurality of types of colloidal particles, and the substrate 4 holding the colloidal structural layer 3A. The plurality of types of colloidal particles includes at least first colloidal particles 1A and second colloidal particles 1B, which are different in average particle size from each other. The colloidal crystal structure 10A further includes the refractive index control material 5 provided on the surface of the colloidal structural layer 3A.

In the colloidal structural layer 3A, the first colloidal particles 1A and the second colloidal particles 1B are arrayed three-dimensionally and regularly in a state of being mixed with each other, and further, the binder 2 is interposed between the first colloidal particles 1A and second colloidal particles 1B. That is, the colloidal structural layer 3A does not have a closely packed colloidal crystal formed in such a manner that the plurality of types of the colloidal particles contact one another, but has a loosely packed colloidal crystal in which the plurality of types of the colloidal particles is spaced apart from one another. Such a loosely packed colloidal crystal as described above is provided, whereby a part of light applied to the colloidal structural layer 3A can cause Bragg reflection, and a part of light that is not reflected can pass through the colloidal structural layer 3A.

Here, when a colloidal crystal having the binder 2 provided between the plurality of types of colloidal particles is made, a fine uneven structure due to a periodic structure of the colloidal crystal may be formed on a surface of the colloidal structural layer 3A, although the degree varies depending on the material. Since optical phenomena, such as diffraction and interference of reflected light, occur due to that uneven structure, color rendering properties and reflection efficiency may be lowered when the colloidal structural layer 3A itself is used for an optical filter, such as illumination.

To suppress the diffraction and interference of the reflected light, as in the first embodiment, the colloidal crystal structure 10A includes the refractive index control material 5 provided on the surface with the convex parts 3a and the concave parts 3b of the colloidal structural layer 3A.

As illustrated in FIG. 4, the refractive index control material 5 is provided to be in contact with the surface with the plurality of convex parts 3a and concave parts 3b of the colloidal structural layer 3A. Preferably, the refractive index control material 5 is provided to fill the plurality of concave parts 3b. By filling the periodic structure of the plurality of convex parts 3a and concave parts 3b, diffraction and interference of reflected light can be suppressed. Note that the thickness of the refractive index control material 5, the material making the refractive index control material 5, and the total light transmittance of the refractive index control material 5 may be the same as those in the first embodiment. Preferably, the refractive index difference between the refractive index control material 5 and the binder 2 of the colloidal structural layer 3A is less than 10%.

Preferably, the refractive index control material 5 is provided to fill at least the plurality of concave parts 3b. Preferably, the refractive index control material 5 is provided to cover the entire of the plurality of convex parts 3a and concave parts 3b. As in the first embodiment, in the colloidal crystal structure 10A, preferably, the surface of the refractive index control material 5 opposite to the surface facing the colloidal structural layer 3A does not have regular unevenness due to the colloidal crystal formed by the plurality of types of colloidal particles 1.

As in the first embodiment, preferably, the colloidal particles (first colloidal particles 1A, second colloidal particles 1B) contained in the colloidal structural layer 3A contain at least one of an inorganic material or a resin material. Preferably, the binder 2 that fixes the colloidal particles contains resin.

An average particle size of the colloidal particles (first colloidal particles 1A, second colloidal particles 1B) in the colloidal structural layer 3A is preferably 0.01 µm to 10 µm, more preferably 10 nm to 1000 nm, still more preferably 50 nm to 300 nm, particularly preferably 70 nm to 280 nm. Then, preferably, a coefficient of variation of particle size of each the first colloidal particles 1A and the second colloidal particles 1B contained in the colloidal structural layer 3A is less than 20%. The coefficient of variation of the particle size of each of the first colloidal particles 1A and the second colloidal particles 1B is less than 20%, whereby it becomes easy for the first colloidal particles 1A and the second colloidal particles 1B to form the regular array in the binder 2. Therefore, the obtained colloidal structural layer 3A becomes capable of reflecting the applied light highly efficiently. Note that the coefficient of variation of the particle size of each of the first colloidal particles 1A and the second colloidal particles 1B is more preferably less than 15%, still more preferably less than 12%, particularly preferably less than 10%, most preferably less than 8%.

The plurality of types of the colloidal particles may include third colloidal particles, fourth colloidal particles, which have different average particle sizes, as well as the first colloidal particles 1 and the second colloidal particles 2. Then, preferably, a coefficient of variation of particle size of each of the third colloidal particles and the fourth colloidal particles is less than 20%.

In the colloidal structural layer 3A, the average particle size of the first colloidal particles 1A and the average particle size of the second colloidal particles 1B are different from each other. Then, as illustrated in FIG. 4, in the colloidal structural layer 3A, the average particle size of the first colloidal particles 1A is larger than the average particle size of the second colloidal particles 1B. As described above, the first colloidal particles 1A and the second colloidal particles 1B, which are different in particle size from each other, adopt the regular array, whereby it is possible to obtain such a colloidal structural layer 3A capable of adjusting a reflection peak wavelength in a reflection spectrum while suppressing a decrease of light reflectivity. Note that, preferably, the regular array adopted by the first colloidal particles 1A and the second colloidal particles 1B is, for example, a close-packed structure, a face-centered cubic structure or a body-centered cubic structure.

Here, it has been known that changing the concentration of colloidal particles in a colloidal crystal film shifts the reflection peak wavelength in the reflection spectrum. In other words, it is possible to appropriately control the reflection peak wavelength by adjusting the concentration of colloidal particles in the colloidal crystal film. However, while the colloidal crystal film exhibits a high reflectance when the concentration of colloidal particles is within a predetermined range, the reflectance greatly decreases when the concentration of the colloidal crystal film is outside the predetermined range. Therefore, when the reflection peak wavelength is adjusted by changing the concentration of colloidal particles, the light reflection ability of the colloidal crystal film may be lowered.

In contrast, in the colloidal structural layer 3A, a content ratio and/or particle sizes of the first colloidal particles 1A and the second colloidal particles 1B are adjusted while maintaining the regular arrangement structure of the colloidal particles, whereby the reflection peak wavelength can be shifted. Therefore, the colloidal structural layer 3A becomes capable of adjusting the reflection peak by such a simple method though having high light reflectivity.

Preferably, in the colloidal structural layer 3A, the plurality of types of the colloidal particles is colloidally crystallized in a state of being mixed with each other to form a colloidal solid solution. In the present description, "colloidal solid solution" refers to one in which a plurality of types of colloidal particles is formed into a colloidal crystal in a mixed state to be provided with a crystal structure similar to a solid solution. That is, as illustrated in FIG. 4, "colloidal solid solution" refers to one in which the first colloidal particles 1A and the second colloidal particles 1B form a regular array in a mixed state and constitute an assembly like a solid solution. Note that the colloidal structural layer 3A can be said to be a structure in which, while the first colloidal particles 1A that form a regular array are maintaining the regular array, the second colloidal particles 1B are substituted for a part of the first colloidal particles 1A. Alternatively, the colloidal structural layer 3A can be said to be a structure in which, while the second colloidal particles 1B which form the regular array are maintaining the regular array, the first colloidal particles 1A are substituted for a part of the second colloidal particles 1B. The colloidal structural layer 3A includes such a colloidal solid solution, whereby there can be obtained a colloidal crystal having characteristics different from a colloidal crystal in which characteristics of a colloidal crystal made of the first colloidal particles 1A and characteristics of a colloidal crystal made of the second colloidal particles 1B are simply combined with each other. That is, the colloidal structural layer 3A can constitute a structure having an intermediate property between the colloidal crystal made of the first colloidal particles 1A and the colloidal crystal made of the second colloidal particles 1B.

Specifically, the colloidal structural layer 3A can have a reflection peak between a reflection peak of the colloidal crystal made of the first colloidal particles 1A and a reflection peak of the colloidal crystal made of the second colloidal particles 1B. As mentioned above, the colloidal structural layer 3A can change the reflection peak wavelength by adjusting the content ratio and/or particle sizes of the first colloidal particles 1A and the second colloidal particles 1B. Therefore, adjustment of these makes it possible to shift the reflection peak to an arbitrary position between the reflection peak of the colloidal crystal made of the first colloidal particles and the reflection peak of the colloidal crystal made of the second colloidal particles.

Figure 5:
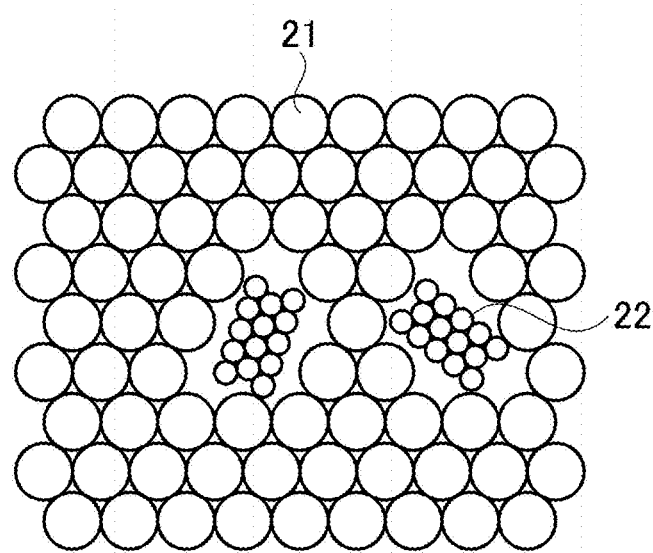
FIG. 5 is a schematic diagram illustrating a state in which two types of colloidal particles different in particle size aggregate independently of each other to establish a eutectic state.

As mentioned above, in the colloidal structural layer 3A, preferably, the first colloidal particles 1A and the second colloidal particles 1B are mixed to constitute the assembly like a solid solution. In other words, preferably, such a eutectic state as illustrated in FIG. 5 is not formed, which is made in such a manner that a colloidal crystal made of colloidal particles 21 having a large particle size and a colloidal crystal made of colloidal particles 22 having a small particle size are mixed with each other. In this case, there appears a reflection peak that results from the colloidal crystal made of the colloidal particles 21 and a reflection peak that results from the colloidal crystals made of the colloidal particles 22, causing a possibility that it may become difficult to shift the reflection peak to an arbitrary position. Therefore, in the colloidal structural layer 3A, preferably, the plurality of types of the colloidal particles constitutes the regular arrangement structure like a solid solution.

The reflection peak wavelength of the colloidal crystal containing only the first colloidal particles 1A as colloidal particles is defined as $\lambda 1$, and the reflection peak wavelength of the colloidal crystal containing only the second colloidal particles 1B as colloidal particles is defined as $\lambda 2$. In this case, in the colloidal structural layer 3A, preferably, the reflection peak wavelength $\lambda$ of the reflection spectrum is present between $\lambda 1$ and $\lambda 2$. Thus, the content ratio and/or particle sizes of the first colloidal particles 1A and the second colloidal particles 1B are adjusted, whereby the reflection peak wavelength $\lambda$ can be shifted to an arbitrary position between $\lambda 1$ and $\lambda 2$. Therefore, it becomes possible to adjust the reflection peak wavelength $\lambda$ in the colloidal structural layer 3A by such a simple method.

Moreover, preferably, an absolute value ($|\lambda 1 - \lambda 2|$) of a difference between the above-mentioned $\lambda 1$ and $\lambda 2$ is 20 nm or more and 200 nm or less. In this case, it becomes easy for the first colloidal particles 1A and the second colloidal particles 1B to be mixed and form the regular array. Therefore, it becomes possible to easily form the colloidal solid solution containing the first colloidal particles 1A and the second colloidal particles 1B, and to shift the reflection peak wavelength λ to an arbitrary position between λ1 and λ2.

In the colloidal structural layer 3A, when the average particle size of the first colloidal particles 1A is d1, and the average particle size of the second colloidal particles 1B is d2, then preferably, a ratio d1/d2 of the average particle sizes is 1.05 or more and less than 1.60. In this case, it becomes easy for the first colloidal particles 1A and the second colloidal particles 1B to be mixed and form the regular array. Therefore, it becomes possible to easily form the colloidal solid solution containing the first colloidal particles 1A and the second colloidal particles 1B, and to shift the reflection peak to an arbitrary position.

In the colloidal structural layer 3A, a center-to-center distance d between the adjacent colloidal particles is preferably 100 nm or more and 300 nm or less, more preferably 140 nm or more and 300 nm or less. As will be described later, in the case of using the colloidal structural layer 3A for an optical filter and a color material, a desired wavelength can be reflected by adjusting the center-to-center distance d of the colloidal particles. Note that the center-to-center distance d between the adjacent colloidal particles can be obtained by observing the surface of the colloidal structural layer 3A by a scanning electron microscope.

As in the first embodiment, in the colloidal structural layer 3A, preferably, a ratio of a volume of the colloidal particles with respect to a volume of the binder 2 is 20% by volume or more and 50% by volume or less. Note that "volume of the colloidal particles" refers to a volume of the whole of the colloidal particles including the first colloidal particle 1A and the second colloidal particle 1B.

As mentioned above, the colloidal structural layer 3A can reflect an arbitrary light component by adjusting the content ratio and/or particle sizes of the first colloidal particles 1A and the second colloidal particles 1B. Therefore, in the colloidal structural layer 3A, preferably, the reflection peak wavelength λ of the reflection spectrum stays within a wavelength range of 300 nm or more and less than 800 nm. In this case, since the colloidal structural layer 3A exhibits reflection characteristics in the visible light range, the colloidal structure 10 becomes an industrially usable structure, for example, for an optical filter, a color material and the like. Note that, in the colloidal structural layer 3A, more preferably, the reflection peak wavelength λ of the reflection spectrum stays within a wavelength range of 450 nm or more and less than 650 nm.

As in the first embodiment, in the colloidal structural layer 3A, preferably, a maximum value of a reflectance in the wavelength range of 300 nm or more and less than 800 nm is 20% or more and less than 100%. In the colloidal structural layer 3A, preferably, a full width at half maximum (FWHM) of a peak of a reflection spectrum having the maximum reflectance in the wavelength range of 300 nm or more and less than 800 nm is 5 nm or more and 100 nm or less.

Preferably, the colloidal crystal structure 10A further includes the substrate 4 that is provided on a surface opposite to one surface of the colloidal structural layer 3A and has translucency. This enables the colloidal structural layer 3A to be held by the substrate 4, which improves the handling of the colloidal crystal structure 10A. Further, since the substrate 4 has translucency, the colloidal crystal structure 10A is usable for an application utilizing transmitted light, such as an optical filter.

In the colloidal crystal structure 10, the shape of the colloidal structural layer 3A is not limited, and for example, can be formed into a film shape. The thickness of the colloidal structural layer 3A is not limited, but for example, preferably 10 μm to 5000 μm, more preferably 1000 μm to 3000 μm. In the colloidal crystal structure 10, the area of the colloidal structural layer 3A is not limited, but preferably, is set to 5 mm² or more and 100 cm² or less.

Next, a method for producing the colloidal crystal structure 10A according to the present embodiment will be described. In the method for producing the colloidal crystal structure 10A, first, the plurality of types of the colloidal particles including at least the first colloidal particles and the second colloidal particles are dispersed together with at least one type of a monomer, whereby a colloidal dispersion liquid is prepared. Specifically, the plurality of types of the colloidal particles is added to a monomer that forms the binder 2 by polymerization. At this time, a liquid matter can be used as the monomer, and powdery matters can be used as the colloidal particles. Note that, in the case of polymerizing the monomer by an active energy ray, a photopolymerization initiator may be added to the colloidal dispersion liquid.

Next, the obtained colloidal dispersion liquid is applied onto a substrate, and a coating film is generated. The coating film is left standing after the coating film is formed, whereby the colloidal particles are arrayed three-dimensionally and regularly. Then, the monomer in the coating film is polymerized, whereby the plurality of types of the colloidal particles is fixed by a polymer. A method for polymerizing the monomer is not limited, and the monomer may be polymerized by heating, or may be polymerized by an active energy ray. By such steps as described above, the colloidal structural layer 3A in which the plurality of types of the colloidal particles is arrayed regularly in the binder can be obtained.

As in the first embodiment, the refractive index control material 5 is formed on the surface, on which the convex parts 3a and the concave parts 3b are formed, of the colloidal structural layer 3A, whereby the colloidal crystal structure 10A can be obtained.

As described above, the colloidal crystal structure 10A according to the present embodiment includes the colloidal structural layer 3A including the plurality of types of the colloidal particles, and the binder 2 arranged between the plurality of types of the colloidal particles to fix the colloidal particles. The colloidal crystal structure 10A further includes the refractive index control material 5 that is provided on one surface of the colloidal structural layer 3A, is transparent, and further has a refractive index difference of less than 10% with respect to the binder 2. The plurality of types of the colloidal particles includes at least the first colloidal particles 1A and the second colloidal particles 1B, which are different in average particle size from each other. The coefficient of variation of the particle size of each of the first colloidal particles 1A and the second colloidal particles 1B is less than 20%. Then, the plurality of types of the colloidal particles forms the regular array in the binder 2. According to the present embodiment, when the colloidal crystal layer 3A has a fine uneven structure due to the periodic structure of the plurality of types of the colloidal particles formed on the surface thereof, the refractive index difference at the interface of the uneven structure can be made substantially equal by the refractive index control material 5. Therefore, the diffraction phenomenon of the reflected light can be suppressed, and the color rendering properties and the reflection efficiency can be prevented from being lowered when the light source is combined with the colloidal crystal structure 10A. When the oxygen permeability of the refractive index control material 5 is low, the oxidation of the binder 2 is suppressed, which enhances the durability of the colloidal crystal layer 3A. Further, the colloidal crystal layer 3A is covered and protected by the refractive index control material 5, which maintains the three-dimensional regular array of the plurality of types of the colloidal particles for a long period of time and maintains a high reflectance.

Preferably, the colloidal structural layer 3A further forms a colloidal solid solution in which a plurality of types of colloidal particles is mixed with each other to form a colloidal crystal. Thus, the structure is formed, which has an intermediate property between the colloidal crystal made of the first colloidal particles 1A and the colloidal crystal made of the second colloidal particles 1B. Therefore, the content ratio and/or particle sizes of the first and second colloidal particles are adjusted, whereby the reflection peak can be provided at an arbitrary position between the reflection peak of the colloidal crystal made of the first colloidal particles and the reflection peak of the colloidal crystal made of the second colloidal particles.

[Light-Emitting Device]

Next, a description will be given of a light-emitting device according to the present embodiment. The light-emitting device of the present embodiment includes an optical filter 32 with a colloidal crystal structure 10, 10 A, and light sources 31. Then, a part of primary light emitted by the light sources 31 passes through the optical filter 32. The light-emitting device includes the optical filter 32 as described above, and can thereby reflect light with a specific wavelength and radiate a desired light component.

Figure 6:
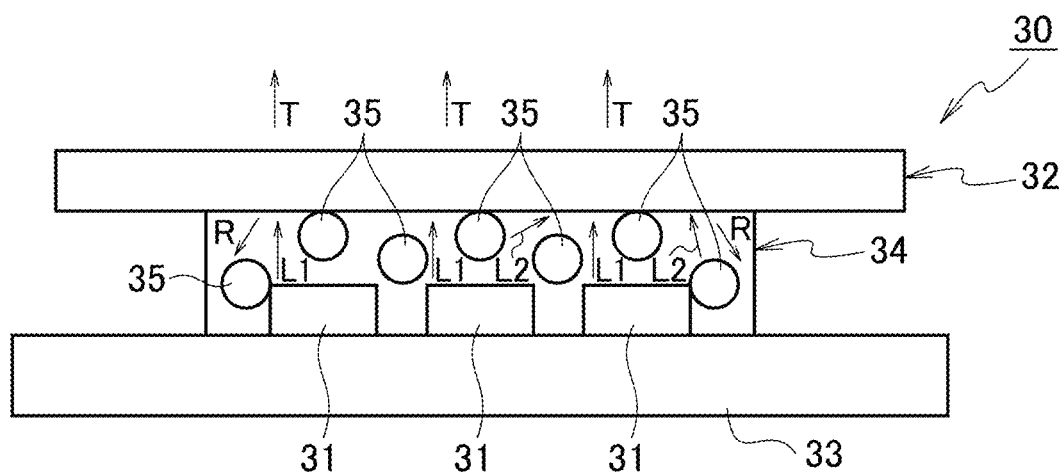
FIG. 6 is a cross-sectional view illustrating an example of a light-emitting device according to the present embodiment.

FIG. 6 illustrates a light-emitting diode module (LED module) 30 as an example of the light-emitting device. In the present embodiment, the light sources 31 are light emitting elements made of LED elements and mounted on a circuit board 33; however, are not limited to these.

As each of the light emitting elements, for example, there can be used: a blue LED element that has a main light emission peak in a wavelength range of 380 nm to 500 nm and emits blue light; and a violet LED element that has a main light emission peak therein and emits a violet light. As such a light emitting element, for example, a gallium nitride LED element is mentioned.

The light-emitting device according to the present embodiment may further include a wavelength conversion member that is excited by reflected light of the primary light reflected by the optical filter 32. Specifically, as illustrated in FIG. 6, the LED module 30 that is the light-emitting device may further include a wavelength conversion member 34. In the present embodiment, the wavelength conversion member 34 covers the light sources 31. In a translucent material such as silicone resin, the wavelength conversion member 34 contains a phosphor 35 that is, for example, at least one of a blue phosphor, a green phosphor, a yellow phosphor or a red phosphor. The blue phosphor is excited by the reflected light of the primary light, and emits blue light. The green phosphor and the yellow phosphor are also excited by the reflected light of the primary light, and emit green light and yellow light, respectively.

The blue phosphor has a light emission peak in a wavelength range of 470 nm to 500 nm, the green phosphor has a light emission peak in a wavelength range of 500 nm to 540 nm, and the yellow phosphor has a light emission peak in a wavelength range of 545 nm to 595 nm. As the blue phosphor, for example, there are mentioned $BaMgAl_{10}O_{17}:Eu^{2+}$, $CaMgSi_2O_6:Eu^{2+}$, $Ba_3MgSi_2O_8:Eu^{2+}$, $Sr_{10}(PO_4)_6Cl_2:Eu^{2+}$ and the like. As the green phosphor, for example, there are mentioned $(Ba,Sr)_2SiO_4:Eu^{2+}$, $Ca_8Mg(SiO_4)_4Cl_2:Eu^{2+}$, $Ca_8Mg(SiO_4)_4O_2:Eu^{2+},Mn^{2+}$. As the yellow phosphor, for example, there are mentioned $(Sr,Ba)_2SiO_4:Eu^{2+}$, $(Y,Gd)_3Al_5O_{12}:Ce^{3+}$, and $\alpha$-Ca—$SiAlON:Eu^{2+}$.

The red phosphor is excited by the reflected light of the primary light or emitted light of at least one of the green phosphor or the yellow phosphor, and emits red light. The red phosphor has a light emission peak in a wavelength range of 600 nm to 650 nm. As the red phosphor, for example, there are mentioned $Sr_2Si_5N_8:Eu^{2+}$, $CaAlSiN_3:Eu^{2+}$, $SrAlSi_4N_7:Eu^{2+}$, $CaS:Eu^{2+}$, $La_2O_2S:Eu^{3+}$, and $Y_3Mg_2(AlO_4)(SiO_4)_2:Ce^{3+}$.

As illustrated in FIG. 6, the optical filter 32 is disposed on a light emitting surface of the LED module 30. Then, a part of the primary light L1 emitted from the light sources 31 passes through the wavelength conversion member 34 and the optical filter 32. Meanwhile, a part of the primary light L1 is reflected by the optical filter 32 as mentioned above. The phosphor 35 of the wavelength conversion member 34 is able to be excited by the primary light L1, but may be excited by reflected light R of the primary light L1, which is reflected by the optical filter 32. That is, the phosphor 35 may be excited by either the primary light L1 or the reflected light R, and may emit secondary light L2. Then, transmitted light T that has passed through the optical filter 32 is emitted from the LED module 30.

When the phosphor 35 of the wavelength conversion member 34 is excited by the reflected light R, the secondary light L2 that shifts to a longer wavelength side with respect to the reflected light R is emitted. In the case of having a wavelength that is not reflected by the optical filter 32, the secondary light L2 passes through the optical filter 32 and is emitted to the outside. In this case, the reflected light R is reused and emitted to the outside, and accordingly, light emission efficiency of the LED module 30 can be improved.

[Lighting System]

Next, a description will be given of a lighting system according to the present embodiment. The lighting system according to the present embodiment includes a light-emitting device.

Figure 7:
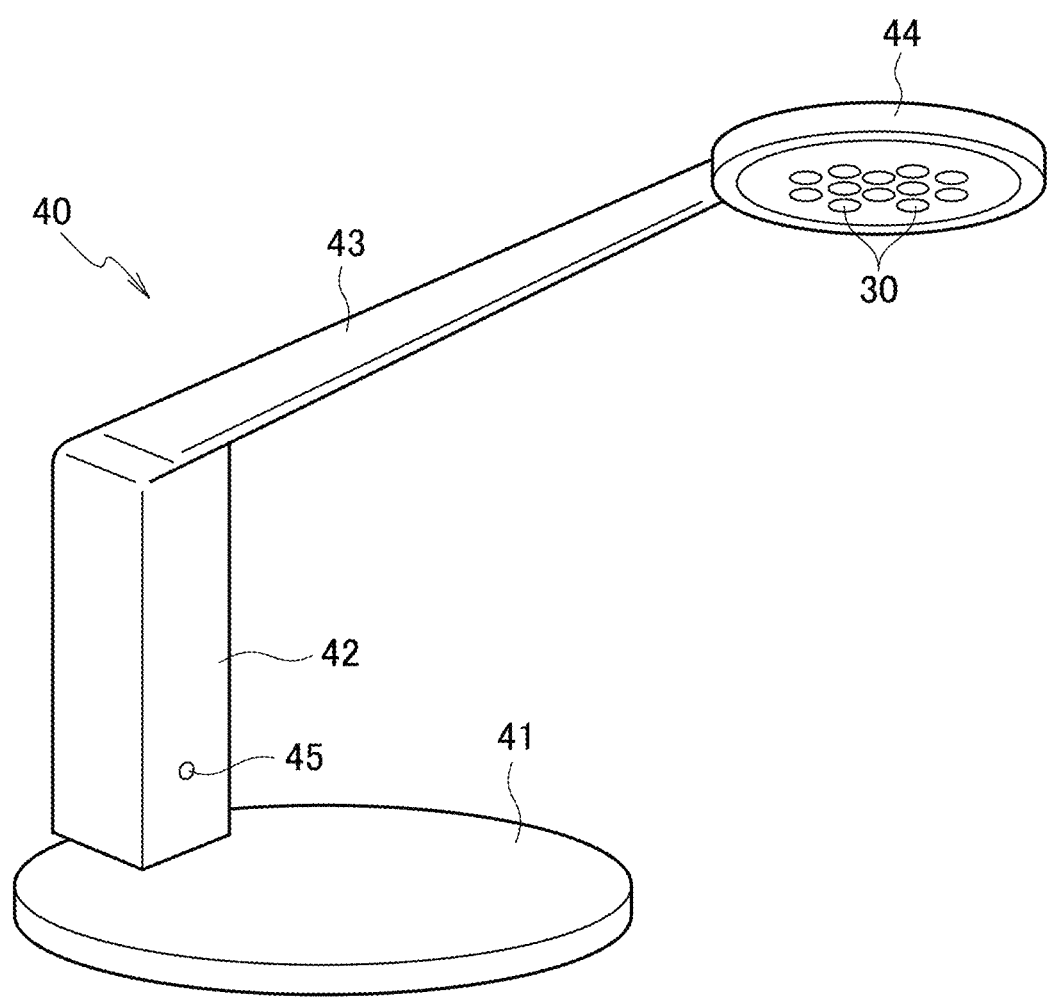
FIG. 7 is a perspective view illustrating an example of a lighting system according to the present embodiment.

FIG. 7 illustrates a desk stand 40, which includes the LED module 30, as an example of the lighting system. As illustrated in FIG. 7, the desk stand 40 is attached with an illumination body 42 on a substantially disc-shaped base 41. The illumination body 42 includes an arm 43, and a lighting appliance 44 on a tip end of the arm 43 includes the LED module 30. A switch 45 is provided on the illumination body 42, and a lighting state of the LED module 30 is changed by switching ON/OFF of the switch 45.

Figure 8:
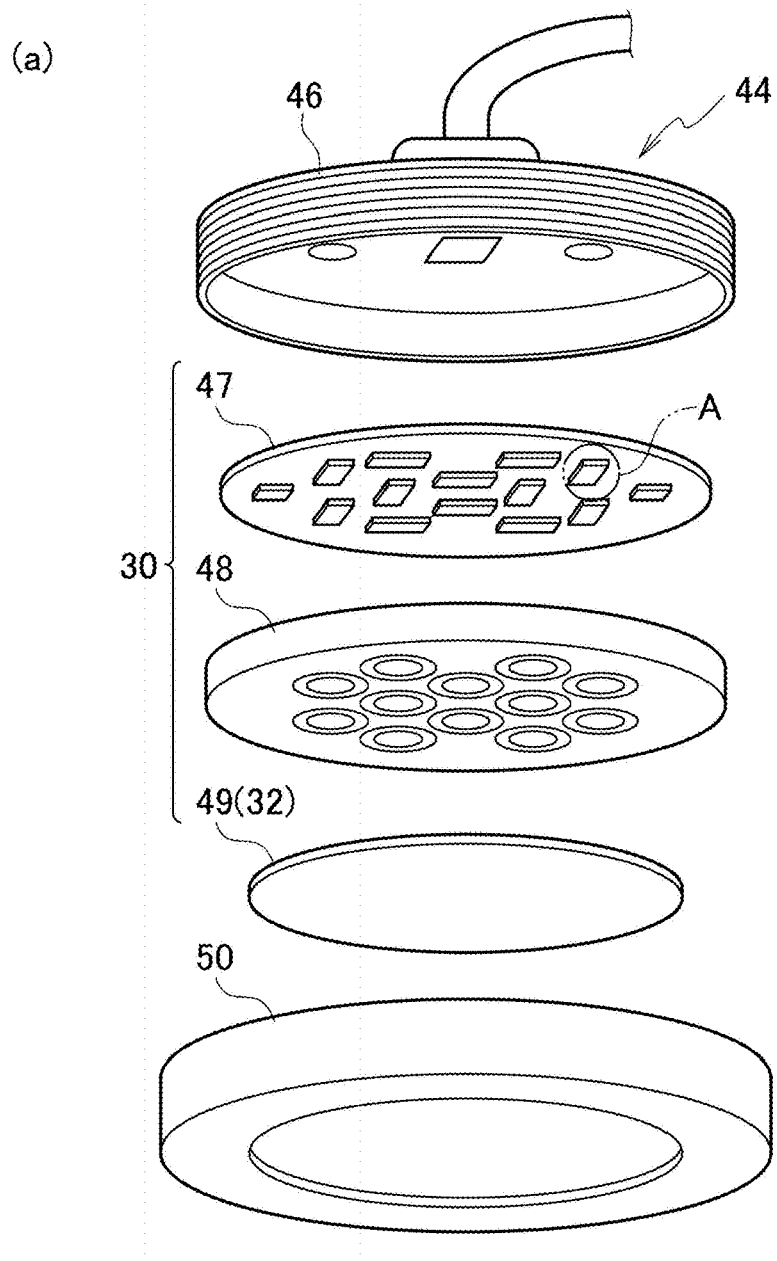
FIG. 8(a) is an exploded perspective view illustrating a lamp in the lighting system according to the present embodiment.
FIG. 8(b) is a schematic cross-sectional view illustrating a light source unit located in an enlarged region A of FIG. 8(a).
Figure 8:
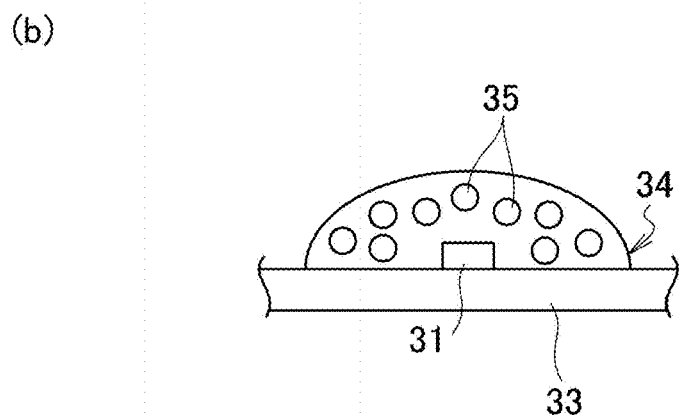

As illustrated in FIG. 8(a), the lighting appliance 44 includes a substantially cylindrical base portion 46, the LED module 30 and a cover 50. The LED module 30 includes a light source unit 47, an orientation control unit 48, and a filter 49 composed of the optical filter 32. As illustrated in FIG. 8(b), the light source unit 47 includes: a circuit board 33; a light source 31 mounted on the circuit board 33; and the wavelength conversion member 34 that is disposed on the circuit board 33 and covers the light source 31. The wavelength conversion member 34 contains the phosphor 35. The orientation control unit 48 is used for controlling light of the light source unit 47 to a desired light distribution, and includes lenses in the present embodiment. However, the orientation control unit 48 may include a reflective plate and a light guide plate depending on the configuration of the lighting system as well as the lenses.

As described above, the lighting system of the present embodiment uses the colloidal crystal structure that is excellent in durability and easy to be subjected to the wavelength control, and accordingly, can easily obtain desired spectral characteristics. That is, the lighting system of the present embodiment becomes capable of enhancing, for example, a whiteness degree of a sheet surface irradiated with the emitted light, and improving visibility thereof. Moreover, it also becomes possible to make skin colors look good, and further, to vividly render colors of foodstuff and plant.

EXAMPLES

A detailed description will be given below of the present embodiment by examples, comparative examples, and a reference example; however, the present embodiment is not limited to these.

Examples and Comparative Examples

The following raw materials were used in producing test samples of Examples 1 and 2, and Comparative examples 1 and 2.
(Colloidal Particles)
Silica particles; average particle size (D50): 180 nm; coefficient of variation of particle size: 5%
Note that the silica particles were synthesized by the Stober method.
(Monomer for Binder)
Triethylene glycol dimethacrylate monomer: NK ester 3G produced by Shin-Nakamura Chemical Co, Ltd.
(Photopolymerization Initiator)
2-hydroxy-2-methyl-1-phenyl-propane-1-on; IRGACURE (registered trademark) 1173 produced by BASF SE
(Monomer for Refractive Index Control Material)
Trimethylolpropane triacrylate monomer; NK ester A-TMPT produced by Shin-Nakamura Chemical Co., Ltd.

Example 1

First, the silica particles were added into the monomer for binder so that a content thereof was 28% by volume. Next, an ultrasonic wave of 20 kHz was applied for 10 minutes under a condition of room temperature (25° C.), whereby the silica particles were dispersed into the monomer. In this way, a colloidal dispersion liquid in which the colloidal particles (silica particles) were evenly dispersed in the monomer was obtained.

Next, the photopolymerization initiator was added by 1.0% by mass to the colloidal dispersion liquid. Then, this dispersion liquid was applied to a glass substrate with a square of 200 mm and a thickness of 1.0 mm by using a bar coater under the condition of room temperature (25° C.). In this case, a bar coater with #18 count was used. Then, the obtained coating film was irradiated with ultraviolet light to polymerize the monomer for binder, whereby a colloidal crystal layer with a layer thickness of approximately 40 μm was formed on the glass substrate.

Next, the monomer for refractive index control material to which the photopolymerization initiator was added by 1.0% by mass was applied to the surface of the colloidal crystal layer under the condition of room temperature (25° C.) using a bar coater. In this case, a bar coater with #4 count was used.

Then, the obtained coating film was irradiated with ultraviolet light to polymerize the monomer for refractive index control material, whereby a refractive index control material with a layer thickness of approximately 5 μm was formed on the surface of the colloidal crystal layer. In this way, a test sample was obtained in which the colloidal crystal layer was formed on the glass substrate and the refractive index control material was formed on the colloidal crystal layer.

For the obtained test sample, the refractive indices of the acrylic resin obtained by polymerizing the monomer for binder and the acrylic resin obtained by polymerizing the monomer for refractive index control material were measured by optical interferometry. Specifically, the refractive indices of these acrylic resins were measured using Thickness Monitor FE-3000 made by Otsuka Electronics Co., Ltd. at a measurement wavelength of 550 nm. As a result, the refractive index of the acrylic resin obtained by polymerizing the monomer for binder was 1.490. The refractive index of the acrylic resin obtained by polymerizing the monomer for refractive index control material was 1.535. Since the refractive index of the refractive index control material is in the range of 1.416 (1.490×0.95) or more and less than 1.565 (1.490×1.05), the refractive index difference between the refractive index control material and the binder was less than 5%.

Comparative Example 1

A test sample having a colloidal crystal layer formed on a glass substrate was obtained in the same manner as in Example 1 except that no refractive index control material was formed.

Example 2

First, the silica particles were added into the monomer for binder so that a content thereof was 32% by volume. Next, an ultrasonic wave of 20 kHz was applied for 10 minutes under a condition of room temperature (25° C.), whereby the silica particles were dispersed into the monomer. In this way, a colloidal dispersion liquid in which the colloidal particles (silica particles) were evenly dispersed in the monomer was obtained.

Next, the photopolymerization initiator was added by 1.0% by mass to the colloidal dispersion liquid. Then, this dispersion liquid was applied to a polymethyl methacrylate (PMMA) substrate with a square of 200 mm and a thickness of 1.0 mm by using a bar coater under the condition of room temperature (25° C.). In this case, a bar coater with #18 count was used. Then, the obtained coating film was irradiated with ultraviolet light to polymerize the monomer for binder, whereby a colloidal crystal layer with a layer thickness of approximately 40 μm was formed on the PMMA substrate.

Next, an extrusion plate made from polymethyl methacrylate with a thickness of 1 mm was prepared. Then, after the extrusion plate was stacked on the surface of the colloidal crystal layer, vacuum lamination was performed using a vacuum laminator. In this way, a test sample in which the colloidal crystal layer was formed on the PMMA substrate and the refractive index control material was further formed on the colloidal crystal layer was obtained.

For the obtained test sample, the refractive indices of the acrylic resin obtained by polymerizing the monomer for binder and the extrusion plate made from polymethyl methacrylate were measured by the same optical interferometry as in Example 1. As a result, the refractive index of the acrylic resin obtained by polymerizing the monomer for binder was 1.490. The refractive index of the extrusion plate made from polymethyl methacrylate was 1.489. Since the refractive index of the extrusion plate is in the range of 1.416 (1.490×0.95) or more and less than 1.565 (1.490×1.05), the refractive index difference between the refractive index control material and the binder was less than 5%.

Comparative Example 2

A test sample having a colloidal crystal layer formed on a PMMA substrate was obtained in the same manner as in Example 2 except that no refractive index control material was formed.

[Evaluation of Test Samples of Examples and Comparative Examples]

(Reflection Spectrum Measurement)

Figure 9:
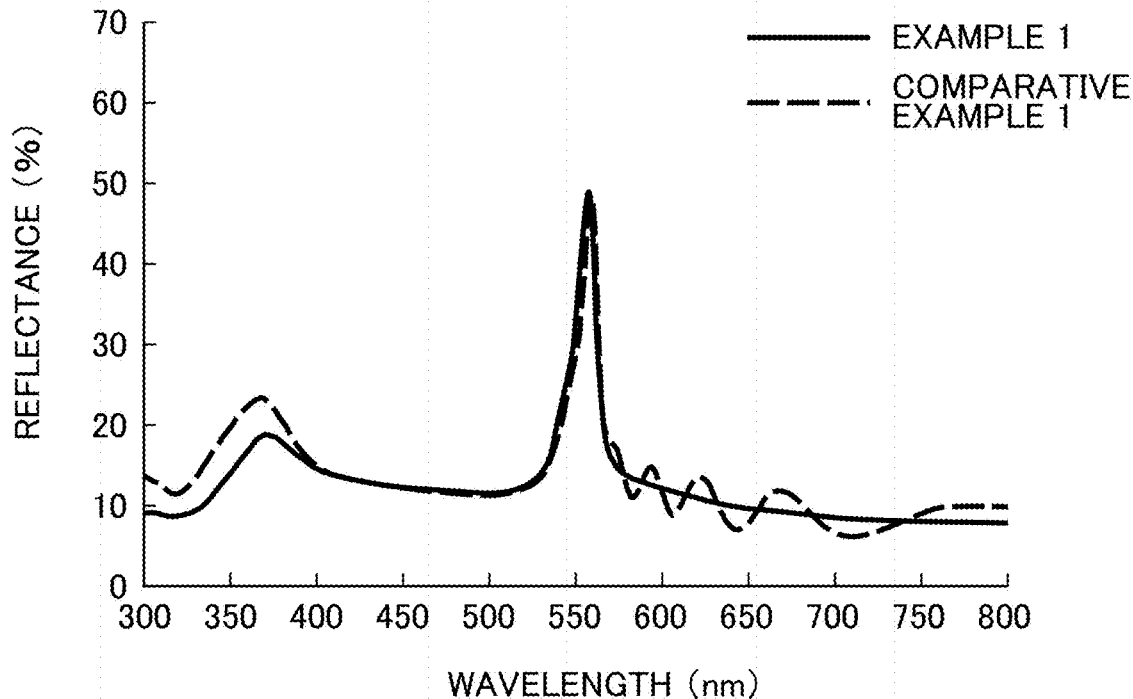
FIG. 9 is a diagram illustrating reflection spectra of test samples of Example 1 and Comparative example 1.

Reflection spectra of the test samples of Examples 1 and 2 and Comparative examples 1 and 2 obtained as described above were measured by using an UV-visible spectrophotometer (UV-2600 made by Shimadzu Corporation). FIG. 9 illustrates the reflection spectra of the test samples of Example 1 and Comparative example 1, and FIG. 10 illustrates the reflection spectra of the test samples of Example 2 and Comparative example 2.

As illustrated in FIG. 9, it is seen that the test sample of Comparative example 1 has reflection peaks, each having a reflectance of less than 20%, at around 590 nm, 620 nm, and 670 nm, whereas the test sample of Example 1 does not have these reflection peaks. Therefore, it is seen that by providing the refractive index control material, the deterioration in color rendering properties due to the sub-peaks is prevented. Further, since the reflectance of the main peak around 560 nm in Example 1 is the same as that in Comparative example 1, it is seen that the reflectance is unlikely to decrease when the refractive index control material is provided.

Figure 10:
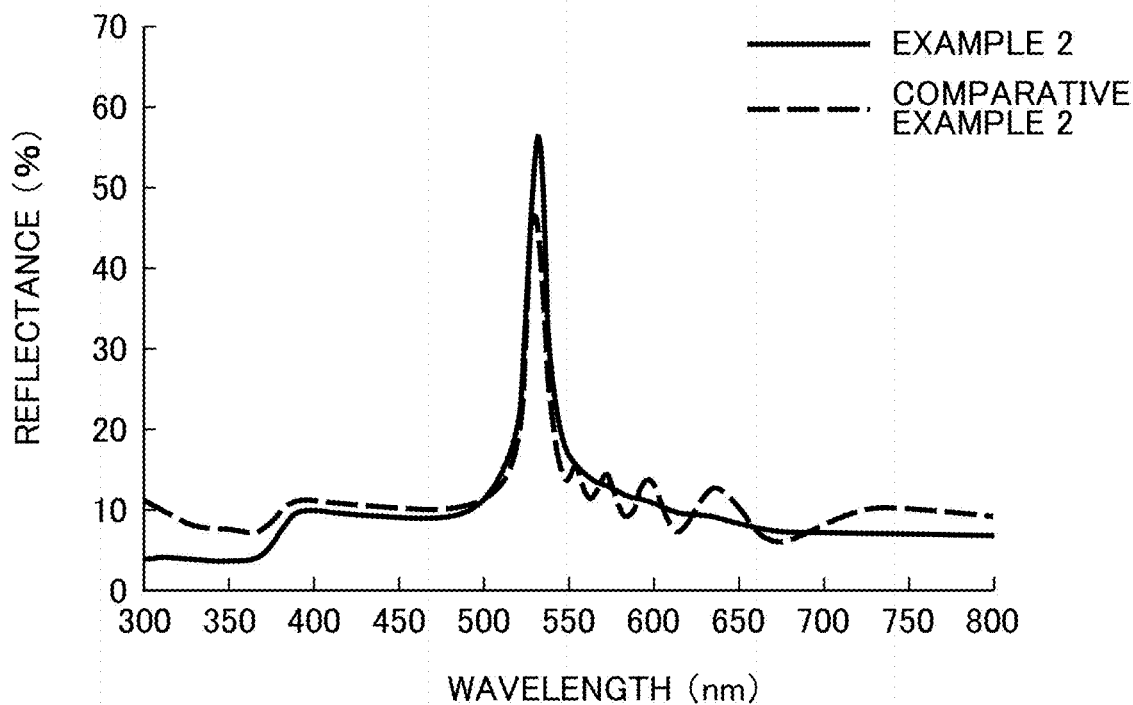
FIG. 10 is a diagram illustrating reflection spectra of test samples of Example 2 and Comparative example 2.

As illustrated in FIG. 10, it is seen that the test sample of Comparative example 2 has reflection peaks, each having a reflectance of less than 20%, at around 575 nm, 600 nm, and 640 nm, whereas the test sample of Example 2 does not have these reflection peaks. Therefore, it is seen that by providing the refractive index control material, the deterioration in color rendering properties due to the sub-peaks is prevented. Further, since the reflectance of the main peak around 530 nm in Example 2 is higher than that in Comparative example 2, it is seen that the reflection efficiency is improved by providing the refractive index control material.

(Observation by Scanning Electron Microscope)

Figure 11:
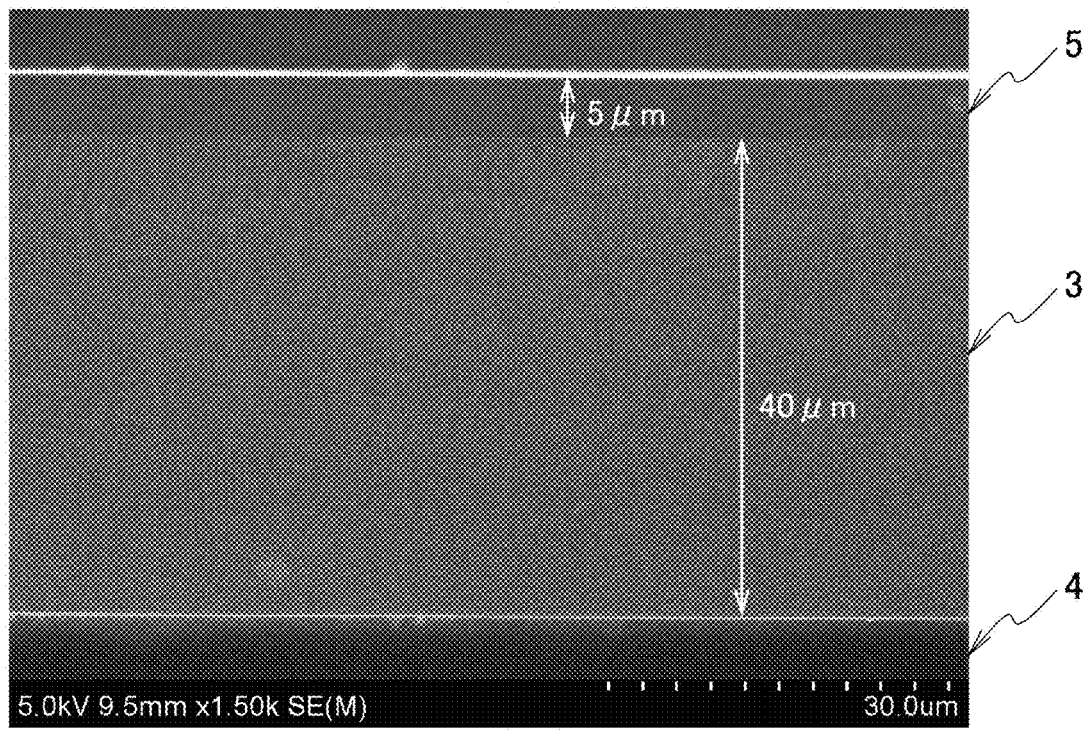
FIG. 11 is a photograph showing a result of a cross section of the test sample of Example 1, which is observed by a scanning electron microscope.
Figure 12:
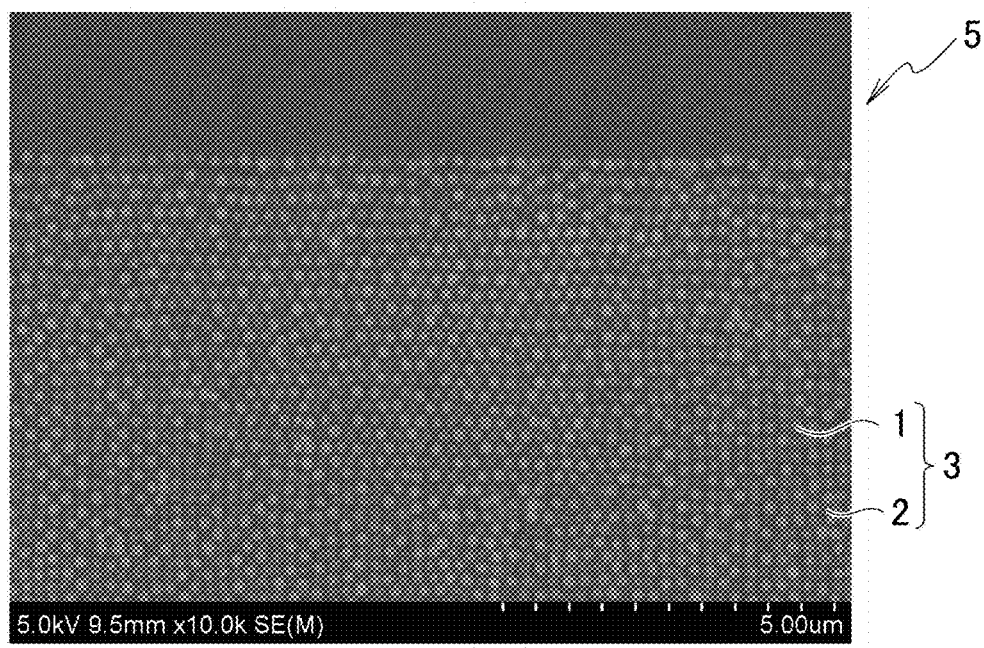
FIG. 12 is a photograph of an enlarged vicinity of an interface between the colloidal crystal layer and a refractive index control material in FIG. 11.

A cross-section of the test sample of Example 1 was observed by a scanning electron microscope. FIG. 11 illustrates a cross section of the test sample of Example 1. FIG. 12 is an enlarged view of the vicinity of the interface between the colloidal crystal layer 3 and the refractive index control material 5 in the cross section of the test sample of Example 1. As illustrated in FIG. 11, it is seen that the refractive index control material 5 is formed in direct contact with the surface of the colloidal crystal layer 3. Further, as illustrated in FIG. 12, it is seen that the colloidal crystal layer 3 has the plurality of colloidal particles 1 regularly arranged, and the binder 2 interposed between the adjacent colloidal particles 1.

(Observation by Atomic Force Microscope)

Figure 13:
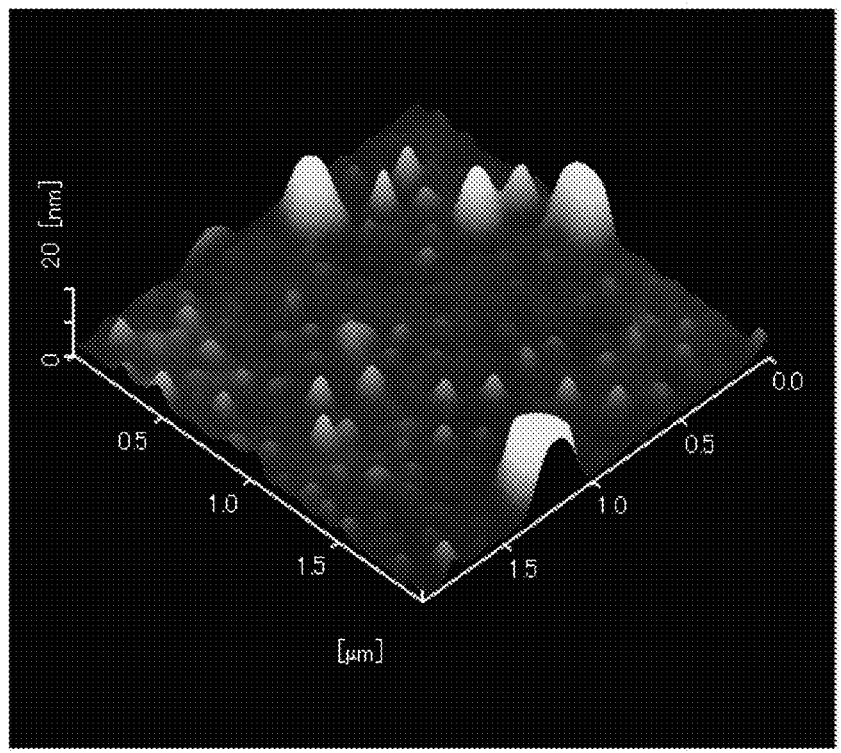
FIG. 13 is a photograph showing a result of observing a surface of the test sample of Example 1 by an atomic force microscope (AFM).
Figure 14:
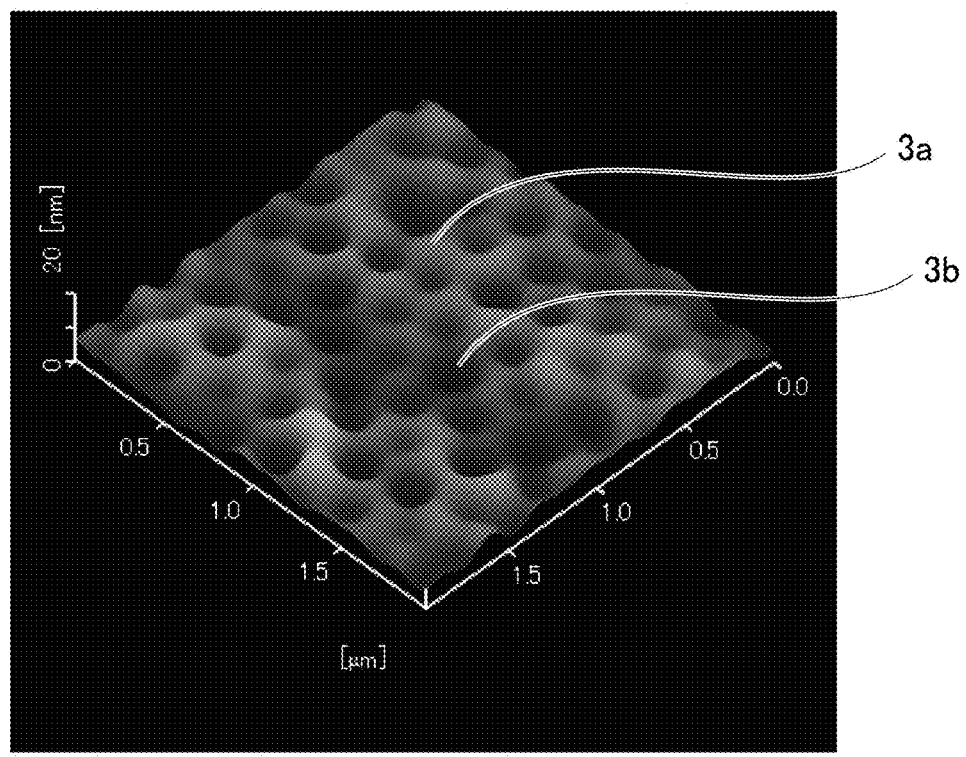
FIG. 14 is a photograph showing a result of observing a surface of the test sample of Comparative example 1 by an atomic force microscope (AFM).

The surfaces of the test samples of Example 1 and Comparative example 1 were observed by an atomic force microscope (AFM). FIG. 13 illustrates a result of observing the surface of the test sample of Example 1 by an atomic force microscope, and FIG. 14 illustrates a result of observing the surface of the test sample of Comparative example 1 by an atomic force microscope.

As illustrated in FIG. 13, it is seen that the surface of the test sample of Example 1 has unevenness but does not have regular unevenness due to the regular array of the colloidal crystal. In contrast, as illustrated in FIG. 14, it is seen that the surface of the test sample of Comparative example 1 has a regular fine uneven structure due to the regular array of colloidal particles. Therefore, from the results of FIGS. 9 and 14, it is assumed that the reflected light is diffracted or interfered by the regular fine uneven structure, and reflection peaks are generated at around 590 nm, 620 nm, and 670 nm wavelength. From the results of FIGS. 9 and 13, it is seen that the diffraction and interference of the reflected light is prevented by filling the regular fine uneven structure due to the regular array of the colloidal particles with the refractive index control material.

Reference Example

The following raw materials were used in producing a test sample of Reference example.

(Colloidal Particles)

Silica particles 1: average particle size (D50): 150 nm; coefficient of variation of particle size: 5%

Silica particles 2: average particle size (D50): 180 nm; coefficient of variation of particle size: 5%

Note that the silica particles 1 and 2 were synthesized by the Stober method.

(Monomer for Binder and Photopolymerization Initiator)

The same monomer for binder and photopolymerization initiator as in Example 1 were used.

First, the silica particles 1 were added into the monomer for binder so that a content thereof was 30% by volume. Next, an ultrasonic wave of 20 kHz was applied for 10 minutes under a condition of room temperature (25° C.), whereby the silica particles 1 were dispersed into the monomer for binder. In this way, a colloidal dispersion liquid 1 in which the colloidal particles (silica particles 1) were evenly dispersed in the monomer was obtained.

Likewise, the silica particles 2 were added into the monomer for binder so that a content thereof was 30% by volume. Next, an ultrasonic wave of 20 kHz was applied for 10 minutes under a condition of room temperature (25° C.), whereby the silica particles 2 were dispersed into the monomer for binder. In this way, a colloidal dispersion liquid 2 in which the colloidal particles (silica particles 2) were evenly dispersed in the monomer was obtained.

Next, the colloidal dispersion liquid 1 and the colloidal dispersion liquid 2 were mixed with each other in a mass ratio of 3:1, and further, a photopolymerization initiator was added thereto by 1.0% by mass. Then, this dispersion liquid was applied to a glass substrate with a square of 200 mm and a thickness of 1.0 mm by using a bar coater under the condition of room temperature (25° C.). In this case, a bar coater with #18 count was used. Then, an obtained coating film was irradiated with ultraviolet light to polymerize the monomer, whereby a test sample in which a colloidal structural layer with a layer thickness of approximately 40 μm was formed on the glass substrate was obtained.

[Evaluation of Test Sample of Reference Example]

(Reflection Spectrum Measurement)

Figure 15:
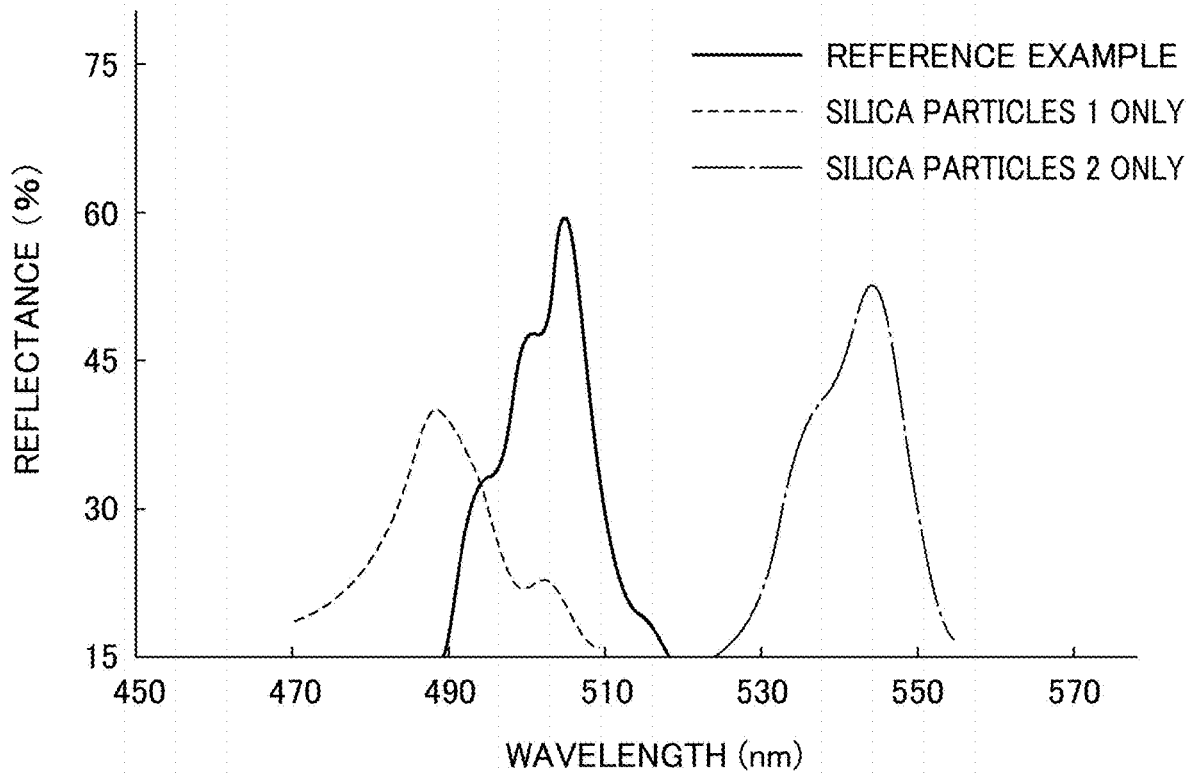
FIG. 15 is a diagram illustrating a reflection spectrum of a test sample of Reference example 1.

The reflection spectrum of the test sample of Reference example obtained as described above was measured by using an UV-visible spectrophotometer (UV-2600 made by Shimadzu Corporation). FIG. 15 illustrates the reflection spectrum of the test sample of Reference example. FIG. 15 also illustrates reflection spectra of samples in which a photopolymerization initiator was added by 1.0% by mass individually to the colloidal dispersion liquid 1 and the colloidal dispersion liquid 2, and thereafter, colloidal crystal bodies were formed similar to Reference example.

As illustrated in FIG. 15, the reflection peak wavelength of the test sample of Reference example is present between a reflection peak wavelength of the colloidal crystal containing only the silica particles 1 as the colloidal particles and a reflection peak wavelength of the colloidal crystal containing only the silica particles 2 as the colloidal particles. Therefore, it is seen that the reflection peak wavelengths is controlled by mixing the silica particles 1 and the silica particles 2 with each other to form the same into a colloidal crystal.

Further, as illustrated in FIG. 15, it is seen that the reflectance of the reflection peak of the test sample of Reference example exceeds 55%, and that the reflectance is higher than those of a reflection peak of the colloidal crystal containing only the silica particles 1 and a reflection peak of the colloidal crystal containing only the silica particles 2. Therefore, it is seen that the reduction of the light reflectivity can be suppressed by forming the colloidal structural layer by using the plurality of types of the colloidal particles.

(Observation by Scanning Electron Microscope)

Figure 16:
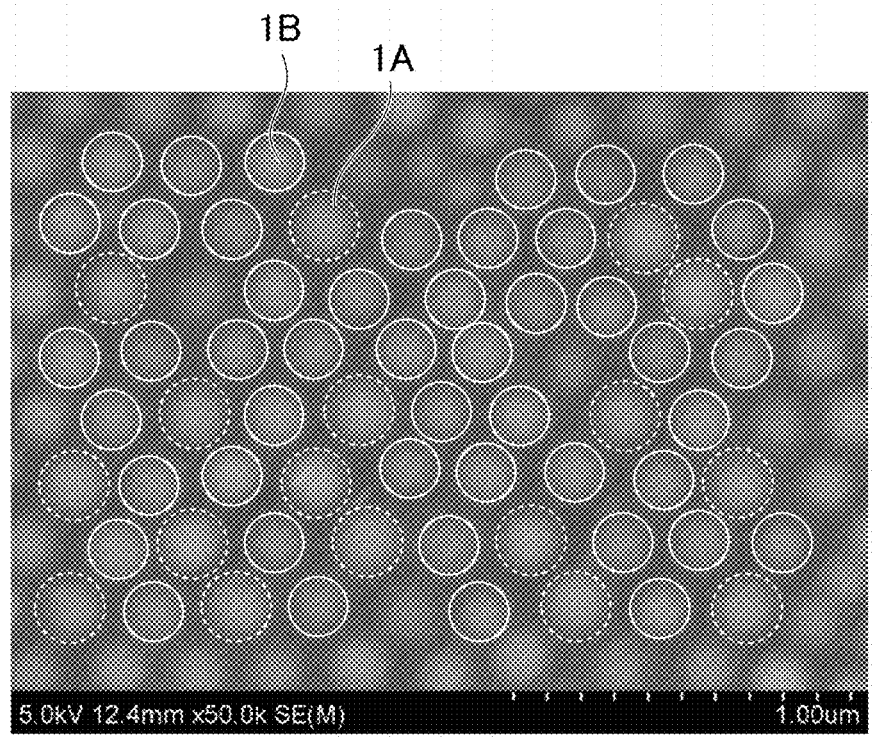
FIG. 16 is a photograph showing a result of a surface of the test sample of Reference example 1, which is observed by a scanning electron microscope.

The surface of the sample of Reference example was observed by a scanning electron microscope. FIG. 16 illustrates a result of observing the surface of the test sample of Reference example by the scanning electron microscope. As illustrated in FIG. 16, it is seen that both of the silica particles 1 (1B) with an average particle size of 150 nm and the silica particles 2 (1A) with an average particle size of 180 nm are arrayed regularly. Moreover, it is seen that a ratio of the number of the silica particles 1 and the number of the silica particles 2 is approximately 3:1. Then, it is seen that, in the test sample of Reference example, the silica particles 1 and the silica particles 2 do not turn to a eutectic state by individually coagulating while being separated from each other, but the silica particles 1 and the silica particles 2 are mixed with each other to be in a state like a solid solution.

Figure 17:
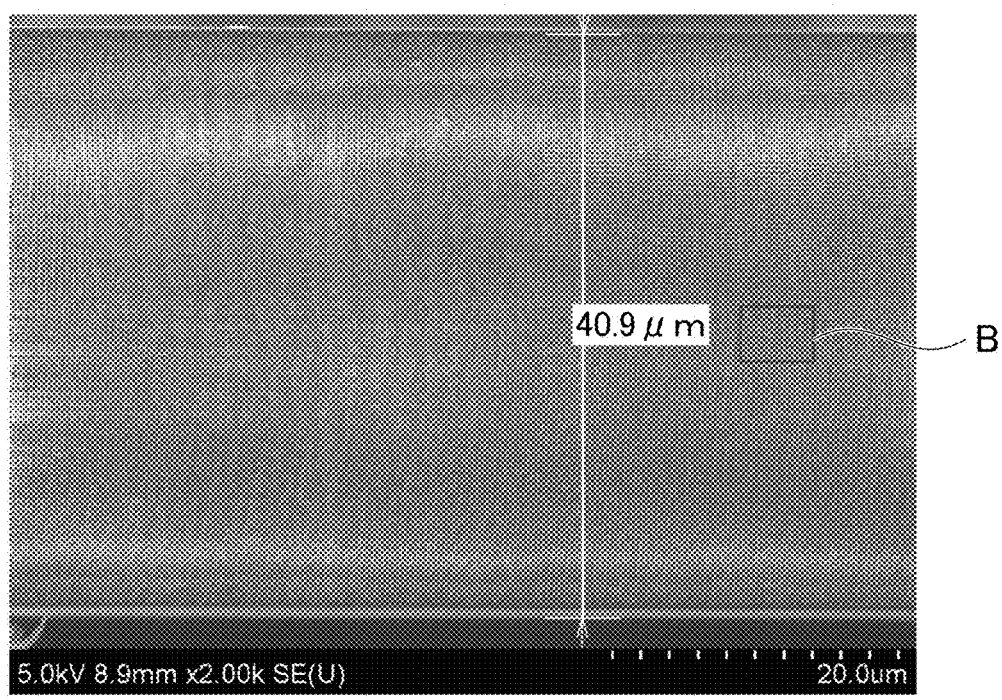
FIG. 17 is a photograph showing a result of a cross section of the test sample of Reference example 1, which is observed by a scanning electron microscope.
Figure 18:
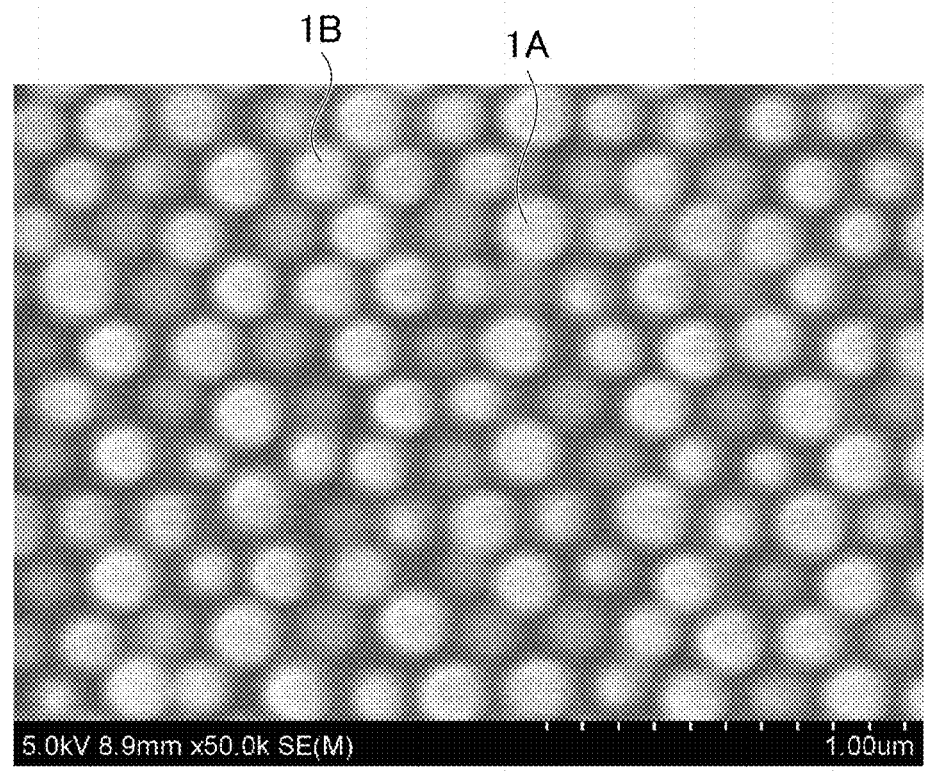
FIG. 18 is a photograph illustrating an enlarged region of reference symbol B in FIG. 17.

FIG. 17 illustrates a result of observing a cross section of the test sample of Reference example by a scanning electron microscope, and FIG. 18 illustrates an enlarged area of reference numeral B in FIG. 17. As illustrated in FIG. 18, it is seen from the cross section of the test sample that both the silica particles 1 (1B) and the silica particles 2 (1A) are arrayed regularly. It is also seen that the silica particles 1 and the silica particles 2 do not turn to a eutectic state by individually coagulating while being separated from each other, but the silica particles 1 and the silica particles 2 are mixed with each other to be in a state like a solid solution.

It is seen that, as described above, in the test sample of Reference example, the silica particles 1 and the silica particles 2 are mixed with each other to be formed into a colloidal crystal, and further, form a three-dimensional regular array in the polymer as a binder. For the test sample of Reference example, it can be easily estimated that the formation of the refractive index control material on the surface of the colloidal structural layer prevents the occurrence of sub-peaks in the reflection spectrum and suppresses the deterioration of color rendering properties and reflection efficiency, as in Examples 1 and 2.

Although the present embodiments have been described above, the present embodiments are not limited thereto, and various modifications are possible within the scope of the gist of the present embodiments. Specifically, in the colloidal crystal structure, the colloidal crystal layer may be a single layer or a plurality of layers. Similarly, in the colloidal crystal structure, the colloidal structural layer may be a single layer or a plurality of layers. In the colloidal crystal structure, the colloidal crystal layer and the colloidal structural layer may be stacked to form a multiple structure.

The entire contents of Japanese Patent Application No. 2019-009444 (filed on: Jan. 23, 2019) are incorporated herein by reference.

INDUSTRIAL APPLICABILITY

In accordance with the present disclosure, there is provided a colloidal crystal structure capable of suppressing deterioration in color rendering properties and reflection efficiency when used in an optical filter, and a light-emitting device and a lighting system using the colloidal crystal structure.

REFERENCE SIGNS LIST

1 Colloidal particles
1A First colloidal particles
1B Second colloidal particles
2 Binder
3 Colloidal crystal layer
3A Colloidal structural layer
3a Convex part
3b Concave part
4 Substrate
5 Refractive index control material
10, 10A Colloidal crystal structure
32 Optical filter
34 Wavelength conversion member

The invention claimed is:

1. A colloidal crystal structure comprising:
a colloidal crystal layer comprising a plurality of colloidal particles, and a binder disposed between the plurality of colloidal particles to fix the colloidal particles; and
a refractive index control material that is provided on one surface of the colloidal crystal layer, is transparent, and has a refractive index difference of less than 10% with respect to the binder,
wherein the plurality of colloidal particles forms a three-dimensionally regular array in the binder, and the regular array adopted by the plurality of colloidal particles is a close-packed structure, a face-centered cubic structure or a body-centered cubic structure, and
wherein the colloidal particles are spaced apart from one another, and the binder is interposed between the colloidal particles.

2. A light-emitting device comprising:
an optical filter comprising the colloidal crystal structure according to claim 1; and
a light source,
wherein a part of primary light emitted by the light source passes through the optical filter.

3. The light-emitting device according to claim 2, further comprising:
a wavelength conversion member configured to be excited by reflected light of the primary light reflected by the optical filter.

4. A lighting system comprising:
the light-emitting device according to claim 2.

5. The colloidal crystal structure according to claim 1, wherein the refractive index control material comprises a surface without regular unevenness due to a colloidal crystal formed by the plurality of colloidal particles, the surface being opposite to a surface facing the colloidal crystal layer.

6. The colloidal crystal structure according to claim 1, further comprising:
a substrate provided on a surface of the colloidal crystal layer opposite to the one surface, the substrate having translucency.

7. The colloidal crystal structure according to claim 1, wherein an average particle size of the colloidal particles in the colloidal crystal layer is 10 nm to 10 μm, and a center-to-center distance between the adjacent colloidal particles is 100 nm or more and 300 nm or less.

8. The colloidal crystal structure according to claim 1, wherein regular convex parts and concave parts are formed on the one surface of the colloidal crystal layer, and
the refractive index control material is provided to be in contact with the one surface with the convex parts and the concave parts of the colloidal crystal layer, and the refractive index control material is provided to fill the concave parts.

9. The colloidal crystal structure according to claim 1, wherein regular convex parts and concave parts are formed on the one surface of the colloidal crystal layer, and
the convex parts and the concave parts of the colloidal crystal layer are formed due to a colloidal crystal formed by the plurality of colloidal particles.

10. A colloidal crystal structure comprising:
a colloidal structural layer comprising a plurality of types of colloidal particles, and a binder disposed between the plurality of types of colloidal particles to fix the colloidal particles; and
a refractive index control material that is provided on one surface of the colloidal structural layer, is transparent, and has a refractive index difference of less than 10% with respect to the binder,
wherein the plurality of types of colloidal particles comprises at least first colloidal particles and second colloidal particles that are different in average particle size from each other,
the first colloidal particles and the second colloidal particles have coefficients of variation of particle size, each being less than 20%,
the plurality of types of colloidal particles forms a three-dimensionally regular array in the binder, and the regular array adopted by the plurality of colloidal particles is a close-packed structure, a face-centered cubic structure or a body-centered cubic structure, and
the colloidal particles are spaced apart from one another, and the binder is interposed between the colloidal particles.

11. The colloidal crystal structure according to claim 10, wherein, in the colloidal structural layer, the plurality of types of colloidal particles is colloidally crystallized in a state of being mixed one another to form a colloidal solid solution.

12. The colloidal crystal structure according to claim 10, wherein the refractive index control material comprises a surface without regular unevenness due to a colloidal crystal formed by the plurality of types of colloidal particles, the surface being opposite to a surface facing the colloidal structural layer.

13. The colloidal crystal structure according to claim 10, further comprising:
a substrate provided on a surface of the colloidal structural layer opposite to the one surface, the substrate having translucency.

14. The colloidal crystal structure according to claim 10, wherein an average particle size of the colloidal particles in the colloidal structural layer is 10 nm to 10 μm, and a center-to-center distance between the adjacent colloidal particles is 100 nm or more and 300 nm or less.

15. The colloidal crystal structure according to claim 10, wherein regular convex parts and concave parts are formed on the one surface of the colloidal structural layer, and
the refractive index control material is provided to be in contact with the one surface with the convex parts and the concave parts of the colloidal structural layer, and the refractive index control material is provided to fill the concave parts.

16. The colloidal crystal structure according to claim 10, wherein regular convex parts and concave parts are formed on the one surface of the colloidal structural layer, and
the convex parts and the concave parts of the colloidal structural layer are formed due to a colloidal crystal formed by the plurality of colloidal particles.

* * * * *